(12) United States Patent
Kerur et al.

(10) Patent No.: US 12,058,053 B2
(45) Date of Patent: Aug. 6, 2024

(54) PARALLEL AND TIERED NETWORK TRAFFIC CLASSIFICATION

(71) Applicant: VIASAT, INC., Carlsbad, CA (US)

(72) Inventors: Ravikiran D. Kerur, Campbell, CA (US); Pawan Uberoy, Pleasanton, CA (US); Praveen V. Madhav, San Jose, CA (US); Siddharth B. Vajirkar, San Jose, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/092,242

(22) Filed: Dec. 31, 2022

(65) Prior Publication Data

US 2023/0246972 A1 Aug. 3, 2023

Related U.S. Application Data

(63) Continuation of application No. PCT/US2021/039434, filed on Jun. 28, 2021.
(Continued)

(51) Int. Cl.
*H04L 47/2441* (2022.01)
*H04L 12/18* (2006.01)
(Continued)

(52) U.S. Cl.
CPC ...... *H04L 47/2441* (2013.01); *H04L 12/1886* (2013.01); *H04L 49/3063* (2013.01); *H04L 49/90* (2013.01)

(58) Field of Classification Search
None
See application file for complete search history.

(56) References Cited

U.S. PATENT DOCUMENTS 9,160,673 B1 * 10/2015 Lang .................... H04L 47/6225
9,215,174 B2 * 12/2015 Kwan ..................... H04L 47/12
(Continued)

FOREIGN PATENT DOCUMENTS

CN 104 702 465 A 6/2015
CN 103488656 * 6/2023
(Continued)

OTHER PUBLICATIONS

Saikat Das et al., "DDOS Intrusion Detection through Machine Learning Ensemble," 2019 IEEE 19th International Conference on Software Quality, Reliability, and Security Companion (QRS-C), 2019, DOI 10.1109/QRS-C.2019.00090, pp. 471-477.
(Continued)

*Primary Examiner* — Andre Tacdiran
(74) *Attorney, Agent, or Firm* — Chang & Hale LLP

(57) ABSTRACT

Described herein are systems and methods for traffic classification that integrate a plurality of different types of traffic classifiers in parallel so that there is little or no adverse effects on data path performance. The systems and methods also integrate a plurality of complementary tiered classifiers to improve or enhance the results of a primary classification technique. Results from the individual parallel and tiered traffic classifiers can be analyzed to determine an output classification. The resulting output traffic classification can be used to determine a preferred or desirable link between nodes on a network where the network includes parallel links or network paths between the nodes. The disclosed systems and methods may be particularly advantageous where the different network paths have different characteristics such as latency, capacity, congestion, cost, bandwidth, etc.

18 Claims, 19 Drawing Sheets

Related U.S. Application Data

(60) Provisional application No. 63/046,913, filed on Jul. 1, 2020.

(51) Int. Cl.
    *H04L 49/00*    (2022.01)
    *H04L 49/90*    (2022.01)

(56) References Cited

U.S. PATENT DOCUMENTS

| | | | |
|---|---|---|---|
| 2005/0220011 A1* | 10/2005 | Parker | H04L 47/2441 370/229 |
| 2005/0226242 A1* | 10/2005 | Parker | H04L 45/7453 370/389 |
| 2009/0086651 A1* | 4/2009 | Luft | H04L 41/5067 370/253 |
| 2014/0226466 A1* | 8/2014 | Pettersson | H04L 43/028 370/229 |
| 2014/0269311 A1 | 9/2014 | Srinivasan et al. | |
| 2018/0083866 A1* | 3/2018 | Gobriel | H04L 45/02 |
| 2018/0227229 A1 | 8/2018 | Lopez | |
| 2020/0042897 A1* | 2/2020 | Fridman | H04L 43/028 |
| 2020/0169509 A1* | 5/2020 | Tigli | H04L 47/2441 |
| 2020/0229078 A1* | 7/2020 | Shin | H04W 24/10 |

FOREIGN PATENT DOCUMENTS

| | | |
|---|---|---|
| EP | 2 891 273 A1 | 7/2015 |
| WO | 2014/036490 A1 | 3/2014 |

OTHER PUBLICATIONS

International Search Report and Written Opinion of the International Searching Authority for PCT App. No. PCT/US2021/039434, dated Oct. 20, 2021, in 32 pages.

Written Opinion of the International Preliminary Examining Authority for PCT App. No. PCT/US2021/039434, dated Jun. 1, 2022, in 18 pages.

International Preliminary Report on Patentability of the International Preliminary Examining Authority for PCT App. No. PCT/US2021/039434, dated Sep. 16, 2022, in 62 pages.

* cited by examiner

PARALLEL AND TIERED NETWORK TRAFFIC CLASSIFICATION

CROSS-REFERENCE TO RELATED APPLICATIONS

This application is a continuation of International Application No. PCT/US2021/039434 filed Jun. 28, 2021 and entitled "Parallel and Tiered Network traffic Classification," which claims the benefit of priority from U.S. Prov. App. No. 63/046,913 filed Jul. 1, 2020 and entitled "Parallel and Tiered Network Traffic Classification," each of which is incorporated by reference in its entirety for all purposes.

BACKGROUND

Field

The present disclosure relates to classification of network traffic.

Description of Related Art

Network resource management is an important issue for internet service providers (ISPs) and other network operators. To improve resource management, different network traffic flows within the network data being transferred can be identified which enables tailored treatment of network data based on identified traffic flows. This can improve quality of service, firewalls, network security, intrusion detection systems, and the like. Network traffic classification encompasses a variety of techniques that enable the identification and classification of traffic flows.

SUMMARY

In a first aspect, the present disclosure provides a network traffic classifier. The network traffic classifier includes a packet queue configured to receive network packets for classification and to replicate the received network packets. The network traffic classifier also includes a plurality of classifier types operating in parallel, individual classifier types configured to receive the replicated network packets from the packet queue, individual classifier types configured to determine a traffic flow classification for individual network packets utilizing network traffic classification techniques that differ from each of the other classifier types. The network traffic classifier also includes a decision module configured to analyze the traffic flow classifications from each of the plurality of classifier types to determine an output traffic flow classification that is assigned to individual network packets of the received network packets.

In some embodiments of the first aspect, the network traffic classifier 1 further includes a flow separator configured to receive the replicated network packets from the packet queue and to identify distinct traffic flows within the replicated network packets. In further embodiments, the flow separator is further configured to generate parallel queues for each classifier type, each parallel queue including network packets from distinct traffic flows. In further embodiments, the network traffic classifier further includes a plurality of flow packet processors configured to process network packets for each traffic flow identified by the flow separator.

In some embodiments of the first aspect, the network traffic classifier further includes a traffic flows data store configured to store the output traffic flow classification determined by the decision module. In further embodiments, the decision module is configured to update the traffic flows data store in response to the output traffic flow classification differing from a previously stored output traffic flow classification for an equivalent traffic flow. In further embodiments, the decision module is configured to generate a new entry in the traffic flows data store in response to the output traffic flow classification being for a unique traffic flow.

In some embodiments of the first aspect, the decision module is configured to update the output traffic flow classification in response to a new traffic flow classification received from one of the plurality of classifier types. In some embodiments of the first aspect, each classifier type includes a plurality of instances of the classifier type that can be activated to process in parallel a plurality of distinct traffic flows. In some embodiments of the first aspect, the plurality of classifier types includes a classifier type that utilizes deep packet inspection and a classifier type that utilizes machine learning to determine the traffic flow classification for individual network packets.

In a second aspect, the present disclosure provides a network node coupled to a plurality of networks. The network node includes a network interface coupled to a plurality of parallel network links. The network node also includes a link selector coupled to the network interface and configured to receive network traffic having a plurality of traffic flows and to select one of the plurality of parallel network links for transmitting an individual traffic flow. The network node also includes a traffic classifier coupled to the link selector and configured to determine a traffic flow classification for individual traffic flows of the plurality of traffic flows using a plurality of parallel classifier types. The link selector selects one of the plurality of parallel network links based at least in part on the traffic flow classification determined by the traffic classifier.

In some embodiments of the second aspect, each of the plurality of parallel network links have different characteristics. In further embodiments, a first network link has a latency that is higher than a latency of a second network link.

In some embodiments of the second aspect, the plurality of classifier types includes a classifier type that utilizes deep packet inspection and a classifier type that utilizes machine learning to determine the traffic flow classification for individual network packets. In some embodiments of the second aspect, the traffic classifier is configured to provide an initial traffic flow classification for a particular traffic flow prior to all of the plurality of classifier types determining individual traffic flow classifications, and to provide a final traffic flow classification that is different from the initial traffic flow classification after each of the plurality of classifier types has determined a traffic flow classification for the particular traffic flow. In some embodiments of the second aspect, the link selector is configured to select an initial network link for a particular traffic flow prior to the traffic classifier determining the traffic flow classification for the individual traffic flow and to select a different network link after the traffic classifier determines the traffic flow classification for the particular traffic flow.

In a third aspect, the present disclosure provides a communications system. The communications system includes a core node communicatively coupled to one or more remote nodes through a gateway device, the core node configured to receive network data having a plurality of traffic flows, the core node having a link selector and a traffic classifier configured to determine a traffic flow classification for individual traffic flows of the plurality of traffic flows using a plurality of parallel classifier types. The communications system also includes a client node communicatively coupled to one or more client devices though a routing device. The communications system also includes a first network link communicatively coupling the core node and the client node. The communications system also includes a second network link parallel to the first network link, the second network link communicatively coupling the core node and the client node. The link selector selects the first network link or the second network link to transmit an individual traffic flow to the client node based at least in part on the traffic flow classification determined by the traffic classifier.

In some embodiments of the third aspect, the first network link has a first characteristic and the second network link has a second characteristic that is different from the first characteristic. In some embodiments of the third aspect, the first network link comprises a satellite network and the second network link comprises a terrestrial network. In some embodiments of the third aspect, the first network link comprises a first satellite network that includes a low earth orbit satellite and the second network link comprises a second satellite network that includes a geosynchronous earth orbit satellite. In some embodiments of the third aspect, the client node comprises a client link selector and a client traffic classifier configured to determine a traffic flow classification for individual return link traffic flows using a plurality of parallel classifier types.

In a fourth aspect, the present disclosure provides a network traffic classifier. The network traffic classifier includes a packet queue configured to receive network packets for classification and to replicate the received network packets. The network traffic classifier also includes a plurality of tiered classifiers, individual tiered classifiers configured to receive the replicated network packets from the packet queue and to determine a traffic flow classification with an associated confidence level for individual network packets utilizing network traffic classification techniques that are complementary to other tiered classifiers of the plurality of tiered classifiers. The network traffic classifier also includes a decision module configured to analyze the traffic flow classifications from each of the plurality of tiered classifiers to determine an output traffic flow classification that is assigned to individual network packets of the received network packets.

In some embodiments of the fourth aspect, the network traffic classifier further includes a flow separator configured to receive the replicated network packets from the packet queue and to identify distinct traffic flows within the replicated network packets. In further embodiments, the flow separator is further configured to generate parallel queues for each tiered classifier, each parallel queue including network packets from distinct traffic flows. In further embodiments, the network traffic further includes a plurality of flow packet processors configured to process network packets for each traffic flow identified by the flow separator.

In some embodiments of the fourth aspect, the decision module is configured to determine the output traffic flow classification based at least in part on analyzing the traffic flow classification with the associated confidence level from the plurality of tiered classifiers. In further embodiments, the decision module is further configured to process the traffic flow classification with the associated confidence level in order starting with a highest order tiered classifier of the plurality of tiered classifiers. In further embodiments, the decision module is further configured to assign the output traffic flow classification responsive to a confidence level from a current tiered classifier exceeding a threshold confidence level associated with the current tiered classifier.

In some embodiments of the fourth aspect, each tiered classifier includes a plurality of instances of the tiered classifier that can be activated to process in parallel a plurality of distinct traffic flows. In some embodiments of the fourth aspect, the plurality of tiered classifiers includes a tier 1 classifier that utilizes deep packet inspection, a tier 2 classifier that utilizes network flow statistics, and a tier 3 classifier that utilizes device fingerprinting. In some embodiments of the fourth aspect, the plurality of tiered classifiers includes a tier 1 classifier that utilizes machine learning and a tier 2 classifier that utilizes device fingerprinting.

In a fifth aspect, the present disclosure provides a network node coupled to a plurality of networks. The network node includes a network interface coupled to a plurality of parallel network links. The network node also includes a link selector coupled to the network interface and configured to receive network traffic having a plurality of traffic flows and to select one of the plurality of parallel network links for transmitting an individual traffic flow. The network node also includes a traffic classifier coupled to the link selector and configured to determine a traffic flow classification for individual traffic flows of the plurality of traffic flows using a plurality of tiered classifiers. The link selector selects one of the plurality of parallel network links based at least in part on the traffic flow classification determined by the traffic classifier.

In some embodiments of the fifth aspect, each of the plurality of parallel network links have different characteristics. In some embodiments of the fifth aspect, a first network link has a latency that is higher than a latency of a second network link. In some embodiments of the fifth aspect, the plurality of tiered classifiers includes a tier 1 classifier that utilizes deep packet inspection, a tier 2 classifier that utilizes network flow statistics, and a tier 3 classifier that utilizes device fingerprinting. In some embodiments of the fifth aspect, the plurality of tiered classifiers includes a tier 1 classifier that machine learning and a tier 2 classifier that utilizes device fingerprinting. In some embodiments of the fifth aspect, the link selector is configured to select an initial network link for a particular traffic flow prior to the traffic classifier determining the traffic flow classification for the individual traffic flow and to select a different network link after the traffic classifier determines the traffic flow classification for the particular traffic flow.

In a sixth aspect, the present disclosure provides a communications system. The communications system includes a core node communicatively coupled to one or more remote nodes through a gateway device, the core node configured to receive network data having a plurality of traffic flows, the core node having a link selector and a traffic classifier configured to determine a traffic flow classification for individual traffic flows of the plurality of traffic flows using a plurality of tiered classifiers. The communications system also includes a client node communicatively coupled to one or more client devices though a routing device. The communications system also includes a first network link communicatively coupling the core node and the client node. The communications system also includes a second network link parallel to the first network link, the second network link communicatively coupling the core node and the client node. The link selector selects the first network link or the second network link to transmit an individual traffic flow to the client node based at least in part on the traffic flow classification determined by the traffic classifier.

In some embodiments of the sixth aspect, the first network link has a first characteristic and the second network link has a second characteristic that is different from the first characteristic. In some embodiments of the sixth aspect, the first network link comprises a satellite network and the second network link comprises a terrestrial network. In some embodiments of the sixth aspect, the first network link comprises a first satellite network that includes a low earth orbit satellite and the second network link comprises a second satellite network that includes a geosynchronous earth orbit satellite. In some embodiments of the sixth aspect, the client node comprises a client link selector and a client traffic classifier configured to determine a traffic flow classification for individual return link traffic flows using a plurality of tiered parallel classifiers.

In a seventh aspect, the present disclosure provides a network traffic classifier. The network traffic classifier includes a packet queue configured to receive network packets for classification and to replicate the received network packets. The network traffic classifier also includes a plurality of classifier types operating in parallel, individual classifier types including a plurality of tiered classifiers, individual classifier types configured to receive the replicated network packets from the packet queue and to determine an initial traffic flow classification for individual network packets utilizing a primary network traffic classification technique and one or more secondary network traffic classification techniques that are complementary to the primary network traffic classification technique, each primary classification technique of the plurality of classifier types being unique relative to the other primary network traffic classification technique. The network traffic classifier also includes a decision module configured to analyze the initial traffic flow classifications from each of the plurality of classifier types to determine an output traffic flow classification that is assigned to individual network packets of the received network packets.

In some embodiments of the seventh aspect, the network traffic classifier further includes a flow separator configured to receive the replicated network packets from the packet queue and to identify distinct traffic flows within the replicated network packets. In further embodiments, the flow separator is further configured to generate parallel queues for each classifier type, each parallel queue including network packets from distinct traffic flows. In further embodiments, the network traffic classifier further includes a plurality of flow packet processors configured to process network packets for each traffic flow identified by the flow separator.

In some embodiments of the seventh aspect, the initial traffic flow classification of an individual classifier type is based at least in part on an analysis of preliminary traffic flow classifications with associated confidence levels from the plurality of tiered classifiers of that individual classifier type. In further embodiments, for an individual classifier type, the initial traffic flow classification is based at least in part on analyzing the preliminary traffic flow classifications with the associated confidence levels in order starting with a highest order tiered classifier of the plurality of tiered classifiers.

In some embodiments of the seventh aspect, each classifier type includes a plurality of instances of the classifier type with its associated tiered classifiers that can be activated to process in parallel a plurality of distinct traffic flows. In some embodiments of the seventh aspect, a first classifier type includes a tier 1 classifier that utilizes deep packet inspection, a tier 2 classifier that utilizes network flow statistics, and a tier 3 classifier that utilizes device fingerprinting, and a second classifier type includes a tier 1 classifier that utilizes machine learning and a tier 2 classifier that utilizes device fingerprinting.

In an eighth aspect, the present disclosure provides a network node coupled to a plurality of networks. The network node includes a network interface coupled to a plurality of parallel network links. The network node also includes a link selector coupled to the network interface and configured to receive network traffic having a plurality of traffic flows and to select one of the plurality of parallel network links for transmitting an individual traffic flow. The network node also includes a traffic classifier coupled to the link selector and configured to determine a traffic flow classification for individual traffic flows of the plurality of traffic flows using a plurality of parallel classifier types, individual classifier types including a plurality of tiered classifiers. The link selector selects one of the plurality of parallel network links based at least in part on the traffic flow classification determined by the traffic classifier.

In some embodiments of the eighth aspect, each of the plurality of parallel network links have different characteristics. In further embodiments, a first network link has a latency that is higher than a latency of a second network link.

In some embodiments of the eighth aspect, a first classifier type includes a tier 1 classifier that utilizes deep packet inspection, a tier 2 classifier that utilizes network flow statistics, and a tier 3 classifier that utilizes device fingerprinting, and a second classifier type includes a tier 1 classifier that utilizes machine learning and a tier 2 classifier that utilizes device fingerprinting. In some embodiments of the eighth aspect, the link selector is configured to select an initial network link for a particular traffic flow prior to the traffic classifier determining the traffic flow classification for the individual traffic flow and to select a different network link after the traffic classifier determines the traffic flow classification for the particular traffic flow.

In a ninth aspect, the present disclosure provides a communications system. The communications system includes a core node communicatively coupled to one or more remote nodes through a gateway device, the core node configured to receive network data having a plurality of traffic flows, the core node having a link selector and a traffic classifier configured to determine a traffic flow classification for individual traffic flows of the plurality of traffic flows using a plurality of parallel classifier types, individual classifier types including a plurality of tiered classifiers. The communications system also includes a client node communicatively coupled to one or more client devices though a routing device. The communications system also includes a first network link communicatively coupling the core node and the client node. The communications system also includes a second network link parallel to the first network link, the second network link communicatively coupling the core node and the client node. The link selector selects the first network link or the second network link to transmit an individual traffic flow to the client node based at least in part on the traffic flow classification determined by the traffic classifier.

In some embodiments of the ninth aspect, the first network link has a first characteristic and the second network link has a second characteristic that is different from the first characteristic. In some embodiments of the ninth aspect, the first network link comprises a satellite network and the second network link comprises a terrestrial network. In some embodiments of the ninth aspect, the first network link comprises a first satellite network that includes a low earth orbit satellite and the second network link comprises a second satellite network that includes a geosynchronous earth orbit satellite. In some embodiments of the ninth aspect, the client node comprises a client link selector and a client traffic classifier configured to determine a traffic flow classification for individual return link traffic flows using a plurality of parallel classifier types, individual classifier types including a plurality of tiered classifiers. In some embodiments of the ninth aspect, a first classifier type includes a tier 1 classifier that utilizes deep packet inspection, a tier 2 classifier that utilizes network flow statistics, and a tier 3 classifier that utilizes device fingerprinting, and a second classifier type includes a tier 1 classifier that utilizes machine learning and a tier 2 classifier that utilizes device fingerprinting. In some embodiments of the ninth aspect, an initial traffic flow classification of an individual classifier type is based at least in part on an analysis of preliminary traffic flow classifications with associated confidence levels from the plurality of tiered classifiers of that individual classifier type. In some embodiments of the ninth aspect, the traffic classifier is configured to update the traffic flow classification in response to a new traffic flow classification received from one of the plurality of classifier types.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes and should in no way be interpreted as limiting the scope of this disclosure. In addition, various features of different disclosed embodiments can be combined to form additional embodiments, which are part of this disclosure.

DETAILED DESCRIPTION OF SOME EMBODIMENTS

Figure 1:
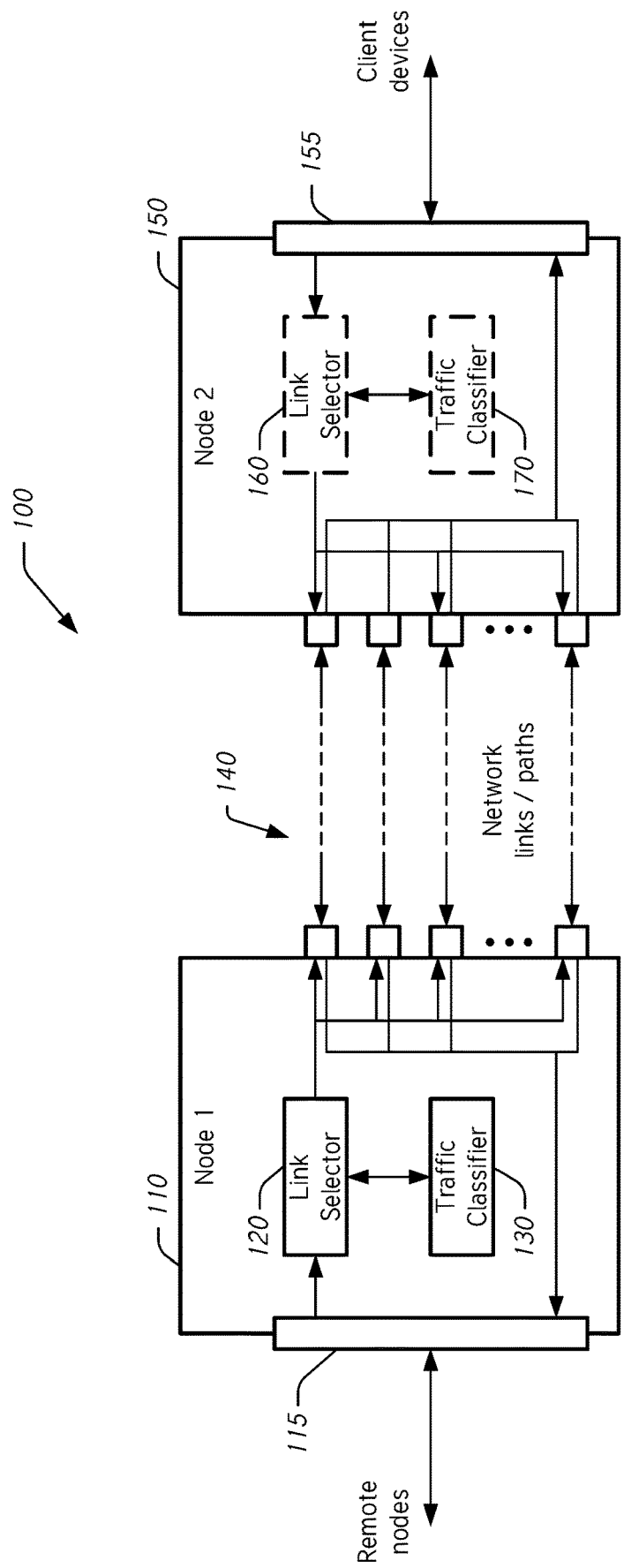
FIG. 1 illustrates a communications system that includes network nodes that use network traffic classification to improve network traffic management over a plurality of parallel network links.

The headings provided herein, if any, are for convenience only and do not necessarily affect the scope or meaning of the claimed invention.

Overview

Network operators are faced with the challenge of managing network traffic to satisfy customer and client expectations and demands. There have been a variety of techniques that have been developed to facilitate improved network traffic management, some of which are based on classifying traffic flows within the network traffic. To this end, many traffic classifiers have been created and each has its own strengths and shortcomings. Traffic classifiers can include algorithms implemented using open source code, proprietary code, and/or custom-designed code. Typically, a traffic classifier is tailored to classify a certain type of network flow (e.g., video, gaming, data, etc.) and/or to classify network flow applications (e.g., HULU® Live, STEAM®, etc.). However, there does not exist a single traffic classifier that excels in all aspects of traffic classification.

Accordingly, to address these and other issues, described herein are systems and methods for traffic classification that integrate a plurality of different traffic classifiers to take advantage of their strengths, to mitigate their respective shortcomings, and/or to improve classification results. The resulting traffic classifications can be used to determine a preferred or desirable link between nodes on a network where the network includes different links or network paths between the nodes. The disclosed systems and methods may be particularly advantageous where the different network paths have different characteristics such as latency, capacity, congestion, cost, bandwidth, etc. In such systems, network traffic can be directed to the link that suits the network traffic, e.g., that results in a satisfactory experience for clients using the network. As an example, a hybrid network may include a high-volume, high-latency link and a low-volume, low-latency link and the disclosed systems and methods can be used to direct network traffic across the link that improves or optimizes delivery of network data.

In some embodiments, the disclosed systems and methods utilize parallel traffic classifier types. In this parallel configuration, improved traffic classification can be achieved with little or no adverse effects on data path performance. To determine a classification of network traffic or a traffic flow, results from the classifier types can be collected, aggregated, compared, and analyzed. The classifications provided by individual, parallel traffic classifier types can be analyzed to determine an output classification that is based at least in part on the initial classifications from one or more of the traffic classifier types. In some embodiments, a weight or other score can be assigned to a traffic classification provided by an individual traffic classifier type. In such embodiments, the output classification can be based at least in part on analysis of the assigned weights or scores from the one or more classifier types.

In certain embodiments, the different traffic classifiers are implemented in a tiered configuration where the tiers complement each other to improve network traffic classification. In this tiered configuration, improved traffic classification can be achieved due at least in part to the complementary nature of the tiered classifiers. To determine a classification of network traffic or a traffic flow, results from the tiered classifiers can be analyzed to determine if an initial classification from a tier (or from that tier and higher ordered tiers) exceeds a confidence level threshold. Based at least in part on this analysis, an output classification can be determined. In some embodiments, the tiers are processed in serial so that the classification process proceeds through the tiers in an ordered fashion (e.g., first classify with tier 1, then classify with tier 2, and so on) until an output classification is achieved. In certain embodiments, each tier operates in parallel and the initial classification results from the tiered classifiers are treated in a tiered manner (e.g., first analyze tier 1, then analyze tier 2, and so on) to determine the output classification.

In certain embodiments, the different traffic classifiers are implemented in parallel to one another, using unique primary classification techniques, and internally include tiered classifiers configured to enhance the associated primary classification techniques. This approach benefits from the variety of different classification techniques available to the different classifier types operating in parallel as well as from the complementary and enhancing techniques of the tiered classifiers.

Advantageously, the disclosed network traffic classification systems and methods enable the use of a variety of traffic classifier techniques or algorithms. Different classification techniques can be implemented together thereby allowing a classification system to take advantage of the strengths of the different techniques while reducing negative effects arising from their weaknesses. Additionally, utilizing different classification techniques can improve classification results by aggregating the results of the various techniques and determining a superior output classification, e.g., a more accurate output classification. Advantageously, implementing traffic classifiers as disclosed herein allows for modularity in the approach to traffic classification. For example, a new traffic classifier can be added to other traffic classifiers to enhance classification results. As another example, individual classifiers can be updated, modified, or removed without adversely affecting performance of the other independent traffic classifiers. Adding a new traffic classifier and/or updating a traffic classifier can be done to expand or to improve the overall classification capabilities of the traffic classifier through the use of newly developed or improved traffic classifier techniques.

Example Networks Using Parallel Network Traffic Classification

FIG. 1 illustrates a communications system 100 that includes network nodes 110, 150 that use network traffic classification to improve network traffic management over a plurality of parallel network links 140. The network traffic classification leverages a plurality of different classification techniques to improve classification results. The communications system 100 includes a first node 110 and a second node 150 with a plurality of parallel network links or data paths 140 providing network communication between the nodes 110, 150. The first node 110 can be connected to one or more remote nodes, e.g., the Internet or other network, while the second node 150 can be connected to one or more client devices, e.g., devices attempting to connect to the Internet or other network.

The first node 110 includes a gateway 115 or other routing device (e.g., a multiplexer) that is connected to the one or more remote nodes. The gateway 115 receives and transmits network traffic to and from the remote nodes. Similarly, the second node 150 includes a routing device 155 (e.g., a multiplexer) that routes network data to and from one or more client devices connected to the second node 150.

The first node 110 includes a link selector 120 and a traffic classifier 130. The link selector 120 receives network data for transmission from the gateway 115. The network data can be divided into distinct traffic flows. The link selector 120 is configured to direct particular traffic flows to a particular network link of the parallel network links 140 for transmission to the second node 150. The link selector 120 is configured to transmit traffic flows to the traffic classifier 130 for classification. The link selector 120 receives classification information from the traffic classifier 130 and determines the network link of the plurality of network links 140 to use to transmit the corresponding traffic flow to the second node 150. As described herein in greater detail, the traffic classifier 130 utilizes a plurality of distinct traffic classifier techniques to determine an output classification for the traffic flow received from the link selector 120.

In some embodiments, the parallel links 140 can each have different properties. For example, the parallel links 140 can have different latencies, capacities, bandwidths, costs, utilization, congestion, etc. In certain embodiments, parallel links 140 can be provided using different network types. For example, a first network link can be a satellite network and a second network link can be a terrestrial network. The link selector 120 can be configured to select an appropriate or suitable link from the parallel network links 140 based at least in part on the traffic classification determined by the traffic classifier 130.

The second node 150 may include a link selector 160 that operates similarly to the link selector 120 of the first node 110 and a traffic classifier 170 that operates similarly to the traffic classifier 130 of the first node 110. For example, the link selector 160 can receive traffic flows from the routing device 155 for transmission to the first node 110 across one of the parallel network links 140. The link selector 160 sends the traffic flows to the traffic classifier 170 for classification, the traffic classifier 170 including a plurality of distinct traffic classifier techniques. Based at least in part on the output classification from the traffic classifier 170, the link selector 160 determines a suitable network link 140 for transmission of the classified traffic flow to the first node 110 and, ultimately, a remote node connected to the first node 110 (e.g., a destination on the Internet). However, it should be understood that the second node 150 can operate without using the link selector 160 and the traffic classifier 170. In such instances, the gateway device 155 routes network data to any suitable network link 140. In certain implementations, this may default to the same link that was used to deliver the network data from the first node 110 to the second node 150, this may default to a default link between the second node 150 and the first node 110, or the gateway device 155 selects the link to use.

In some embodiments, network data that is part of the same traffic flow is routed over the same link when going from the first node 110 to the second node 150 and when going from the second node 150 to the first node 110. For example, a traffic flow is routed over a first network link from the first node 110 to the second node 150 and is routed over the same link from the second node 150 to the first node 110. In certain embodiments, network data that is part of the same traffic flow is routed over different links when going from the first node 110 to the second node 150 and when going from the second node 150 to the first node 110.

In various embodiments, network data that is part of the same traffic flow can be routed over different links when going from the first node 110 to the second node 150 (e.g., a first portion of the traffic flow is routed over a first network link of the parallel links 140 and a second portion of the traffic flow is routed over a second network link of the parallel links 140). This may occur, for example, when a classification of the network flow is updated or changed by the traffic classifier 130. This may occur, as another example, when conditions or properties of the selected link changes (e.g., due to changes in congestion, available capacity, available bandwidth, etc.).

In some embodiments, the first node 110 is an internet service provider providing internet service and the second node 150 is a home or business subscriber. In certain embodiments, the second node 150 is a node or nodes on an airplane to which passengers can connect for internet service and/or pilots can connect for communications service. In various implementations, rather than an airplane, the second node 150 is a node or nodes on a car, train, ship, or other vehicle to which passengers can connect for internet service.

Figure 2A:
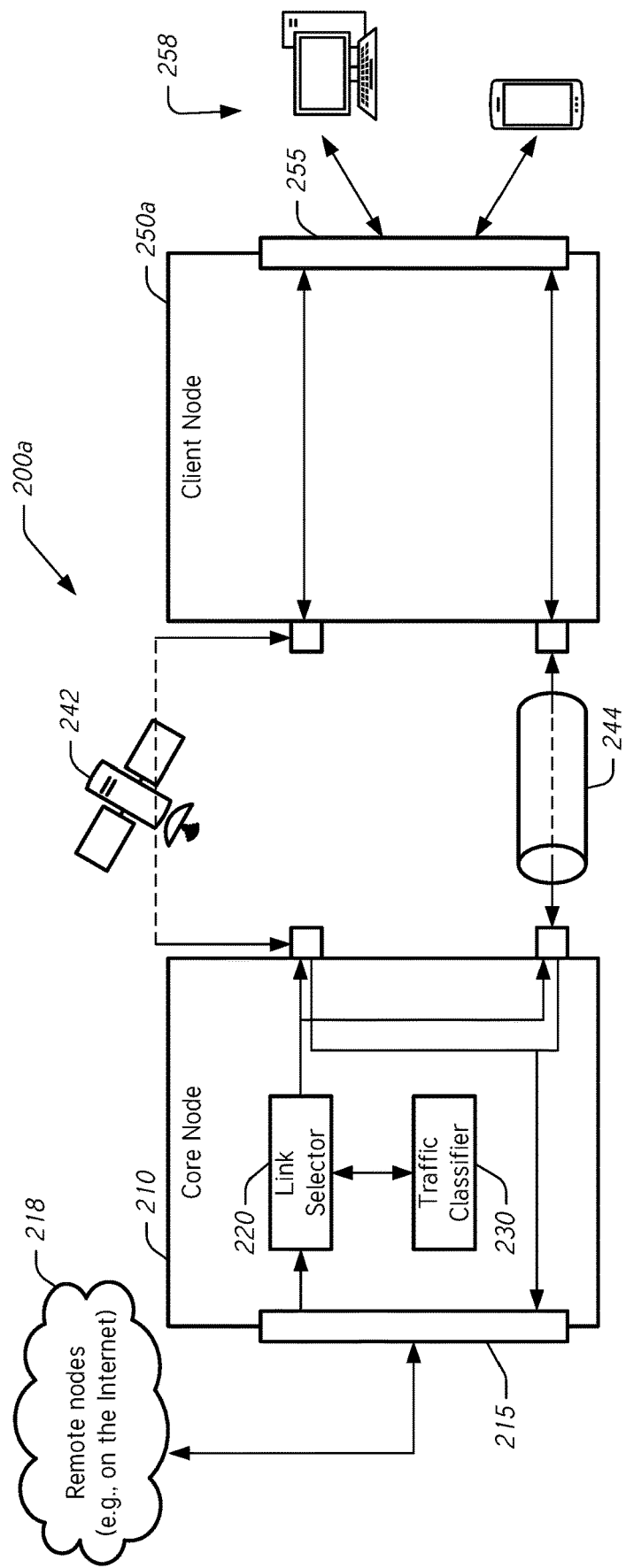
FIGS. 2A, 2B, and 2C illustrate example communications systems that are particular implementations of the communications system of FIG. 1.

FIG. 2A illustrates an example communications system 200*a* that is a particular implementation of the communications system 100 of FIG. 1. Accordingly, elements of the communications system 200*a* are similar to elements of the communications system 100. For example, the communications system 200*a* includes a core node 210 that is similar to the first node 110 of the communications system 100. The core node 210 includes a gateway 215, a link selector 220, and a traffic classifier 230 respectively similar to the gateway 115, the link selector 120, and the traffic classifier 130 of communications system 100. Similarly, the communications system 200*a* includes a client node 250*a* that is similar to the second node 150 of the communications system 100. The client node 250*a* includes a routing device 255 similar to the routing device 155 of communications system 100.

The core node 210 is connected to remote nodes 218 (e.g., the Internet) through the gateway 215. The client node 250*a* is coupled to a plurality of client devices 258 through the routing device 255. A first network link 242 provided by a satellite network couples the core node 210 and the client node 250*a*. A second network link 244 provided by a terrestrial network also couples the core node 210 and the client node 250*a*, the second network link 244 parallel to the first network link 242. In some embodiments, the first network link 242 has a higher latency than the second network link 244.

By way of example, the first network link 242 may include one or more satellites, one or more satellite user terminals, gateway terminals, network operations centers (NOCs), satellite and gateway terminal command centers, and/or the like. In some embodiments, the first network link 242 includes a geosynchronous earth orbit (GEO) satellite or satellites, a medium earth orbit (MEO) satellite or satellites, and/or a low earth orbit (LEO) satellite or satellites. By way of example, the second network link 244 may be any type of terrestrial network and may include a public switched telephone network (PSTN), a public land mobile network, a digital subscriber line (DSL), a cable network, a cellular network, a wireless local area network or WiFi connection, or any combination of these.

As described herein, the core node 210 utilizes the traffic classifier 230 to classify traffic flows to enable the link selector 220 to select the link that matches the type of the traffic flow. For example, a traffic flow carrying gaming data is typically latency sensitive and is therefore typically sent over the low-latency second network link 244 whereas email data is typically not latency sensitive and is therefore typically sent over the high-latency, high-volume first network link 242. It should be understood that the terms low-latency and high-latency are used herein to indicate the relative latencies of the networks with respect to one another and not necessarily to a fixed threshold that divides high- and low-latency networks.

The client node 250*a* can use the routing device 255 to combine traffic from the links 242, 244 and then distribute the traffic to the appropriate client device 258. This allows different client devices 258 to receive traffic on different links 242, 244. In combination with the link selector 220 and the traffic classifier 230 of the core node 210, this architecture allows for latency-insensitive traffic to be identified and delivered to a first client device over the high-latency link 242 and latency-sensitive traffic to be identified and delivered to a second client device over the low-latency link 244. As an example, email can be provided to the first client device over the high-latency link 242 while video can be provided to the second client device over the low-latency link 244, resulting in the video being delivered without buffering.

Figure 2B:
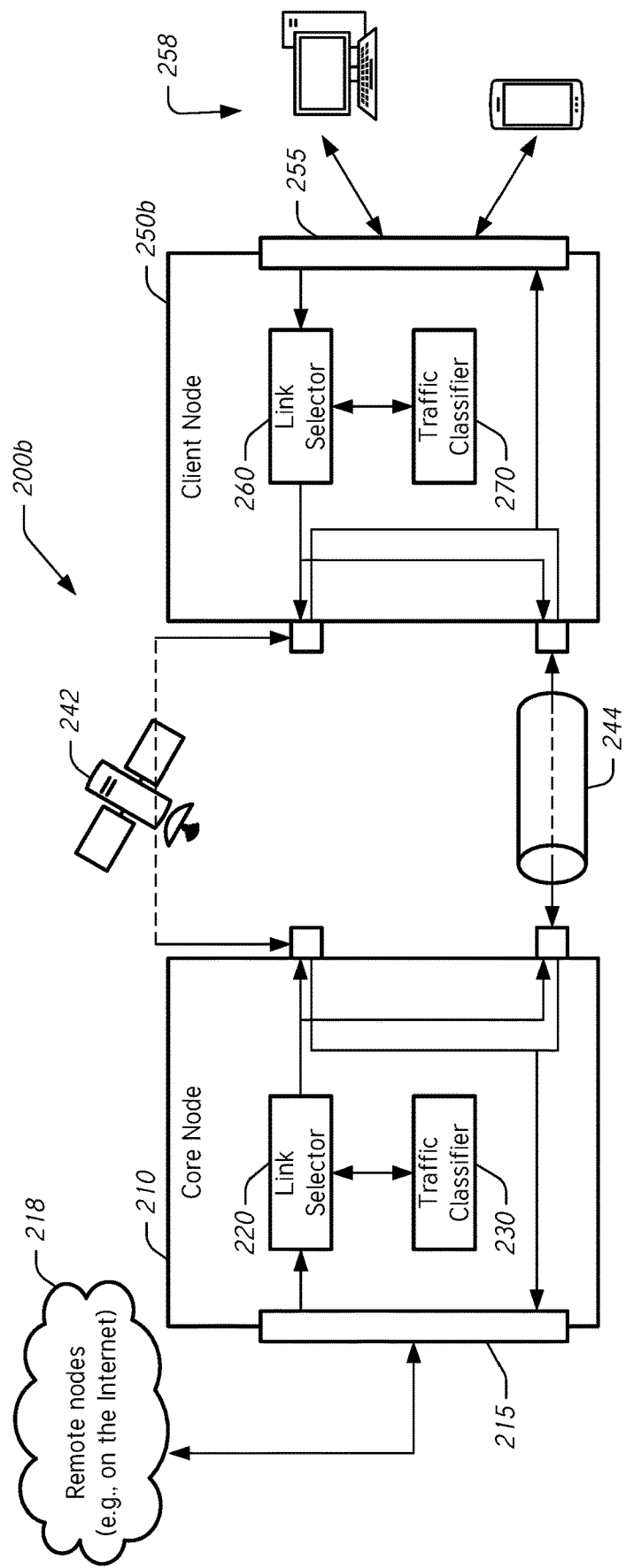

FIG. 2B illustrates another example communications system 200*b* that is a particular implementation of the communications system 100 of FIG. 1. The communications system 200*b* is generally the same as the communications system 200*a* of FIG. 2A except that the client node 250*b* differs from the client node 250*a*. Both client nodes 250*a*, 250*b* include the routing device 255 described above, but the client node 250*b* of the communications system 200*b* includes a link selector 260 and a traffic classifier 270 respectively similar to the link selector 160 and the traffic classifier 170 of the communications system 100.

The link selector 260 and the traffic classifier 270 enable the client node 250*b* to determine classifications for traffic flows from the client devices 258 to the remote nodes 218. Responsive to determined classifications, the link selector 260 can select a suitable link for traffic flows from the client devices 258 to the remote nodes 218 similar to what is done by the link selector 220 of the core node 210.

Figure 2C:
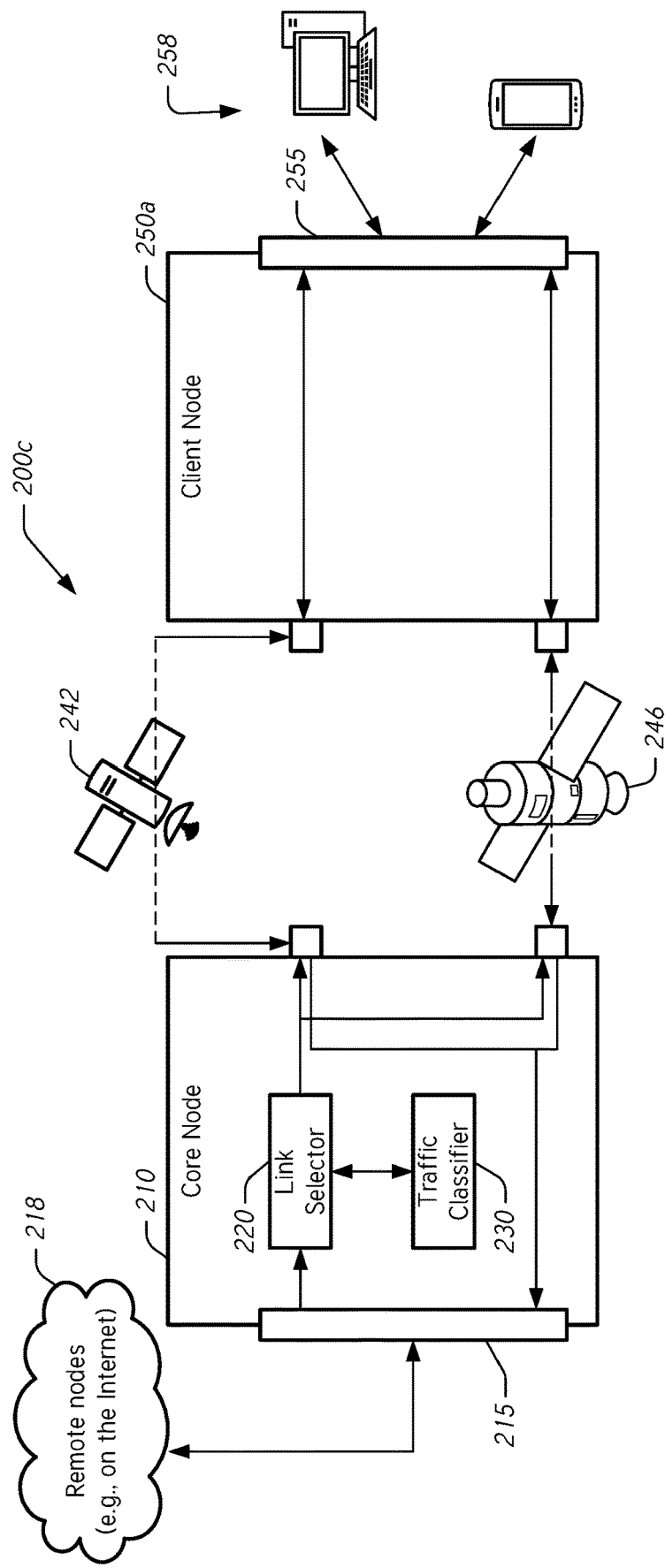

FIG. 2C illustrates another example communications system 200c that is a particular implementation of the communications system 100 of FIG. 1. The communications system 200c is generally the same as the communications system 200a of FIG. 2A except that the first network link 242 is provided by a first satellite network and the second network link 246 is provided by a second satellite network. In some embodiments, the first satellite network and the second satellite network can be provided by satellites of different types and/or by satellites in different classes of orbits. The first network link 242 and the second network link 246 can include one or more satellites, one or more satellite user terminals, gateway terminals, network operations centers (NOCs), satellite and gateway terminal command centers, and/or the like. In some embodiments, the first network link 242 includes a geosynchronous earth orbit (GEO) satellite or satellites, a medium earth orbit (MEO) satellite or satellites, and/or a low earth orbit (LEO) satellite or satellites. In certain embodiments, the second network link 246 includes a geosynchronous earth orbit (GEO) satellite or satellites, a medium earth orbit (MEO) satellite or satellites, and/or a low earth orbit (LEO) satellite or satellites. For example, the first network link 242 can include a LEO satellite or satellites and the second network link 246 can include a GEO satellite or satellites. As another example, the first network link 242 can include a MEO satellite or satellites and the second network link 246 can include a GEO satellite or satellites.

Figure 3:
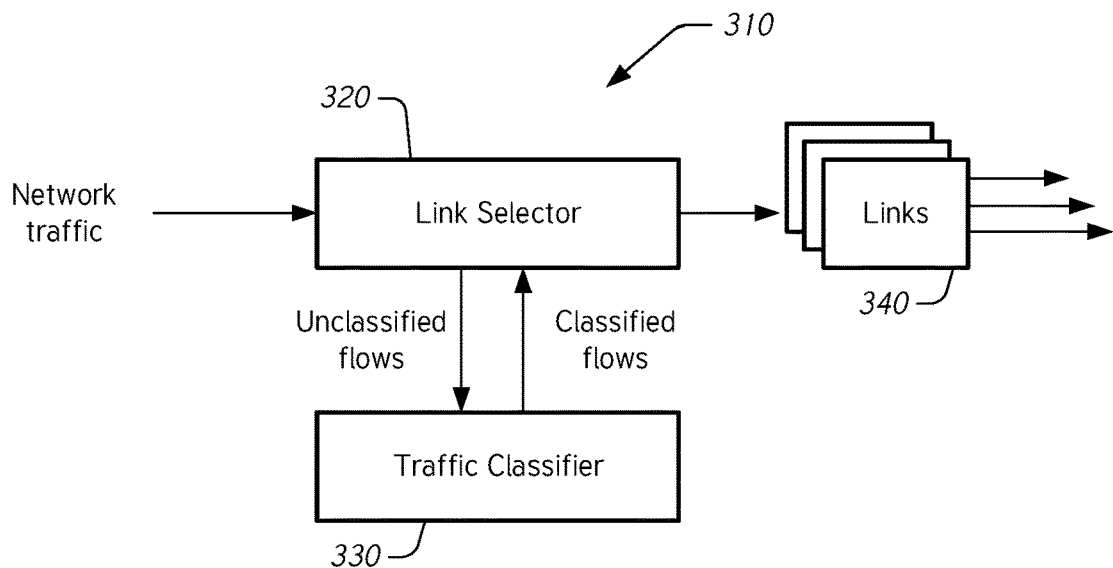
FIG. 3 illustrates schematically a process that uses a link selector to route traffic flows over suitable network links based at least in part on classifications determined by a traffic classifier.

FIG. 3 illustrates schematically a process that uses a link selector 320 to route traffic flows over suitable network links 340 based at least in part on classifications determined by a traffic classifier 330. The link selector 320 can be any of the link selectors 120, 220, 160, 260 described herein with reference to FIGS. 1-2C. The traffic classifier 330 can be any of the traffic classifiers 130, 230, 170, 270, 430, 530, 830, 930 described herein with reference to FIGS. 1-6 and 8-10. The network links 340 can be any of the network links 140, 242, 244 described herein with reference to FIGS. 1-2C. The process in FIG. 3 will be described as routing traffic from a remote node to a client device, but it is to be understood that the process may be performed to route traffic from a client device to a remote node, as described elsewhere herein.

Flows of forward link network traffic from a remote node (e.g., on the Internet) and destined for a client device (e.g., connected to a client node) are received at a core node. The network traffic is sent to the link selector 320 which passes the received packets to the traffic classifier 330 as unclassified traffic flows. The traffic classifier 330 receives the unclassified traffic flows and attempts to classify the traffic flows using different traffic classifier modules working together. The traffic classifier 330 sends the traffic flows back to the link selector 320 with classifications associated with the packets of the traffic flows. Examples of types of traffic flows include video data, web data, VoIP data, gaming data, etc. Based at least in part on the classification of the traffic flows, the link selector 320 selects a link from the plurality of parallel links 340 to transmit the corresponding network packets. The network packets are then sent to the client device over the selected link of the plurality of parallel links 340.

In some embodiments, the traffic classifier 330 needs a certain volume of traffic or packets to enable accurate or effective traffic flow classification. In such instances, the link selector 320 can be configured to initially send traffic over a first network link (e.g., a high-latency/high-volume network) and then update or change the link (if different) in response to the classification provided by the traffic classifier 330.

In some embodiments, the link selector 320 is configured to utilize volume-related information in determining the link to use. For example, the link selector 320 can be configured to use a designated link for traffic flows, regardless of classification, until a volume-related threshold has been surpassed. Once this threshold has been exceeded, the link selector 320 can be configured to switch links based at least in part on classification results from the traffic classifier 330. In certain implementations, the link selector 320 bypasses the traffic classifier 330 until a volume-related threshold has been achieved. This can be done to improve efficiency of the node 310.

Examples of Traffic Classifiers with Parallel Classifier Types

Figure 4:
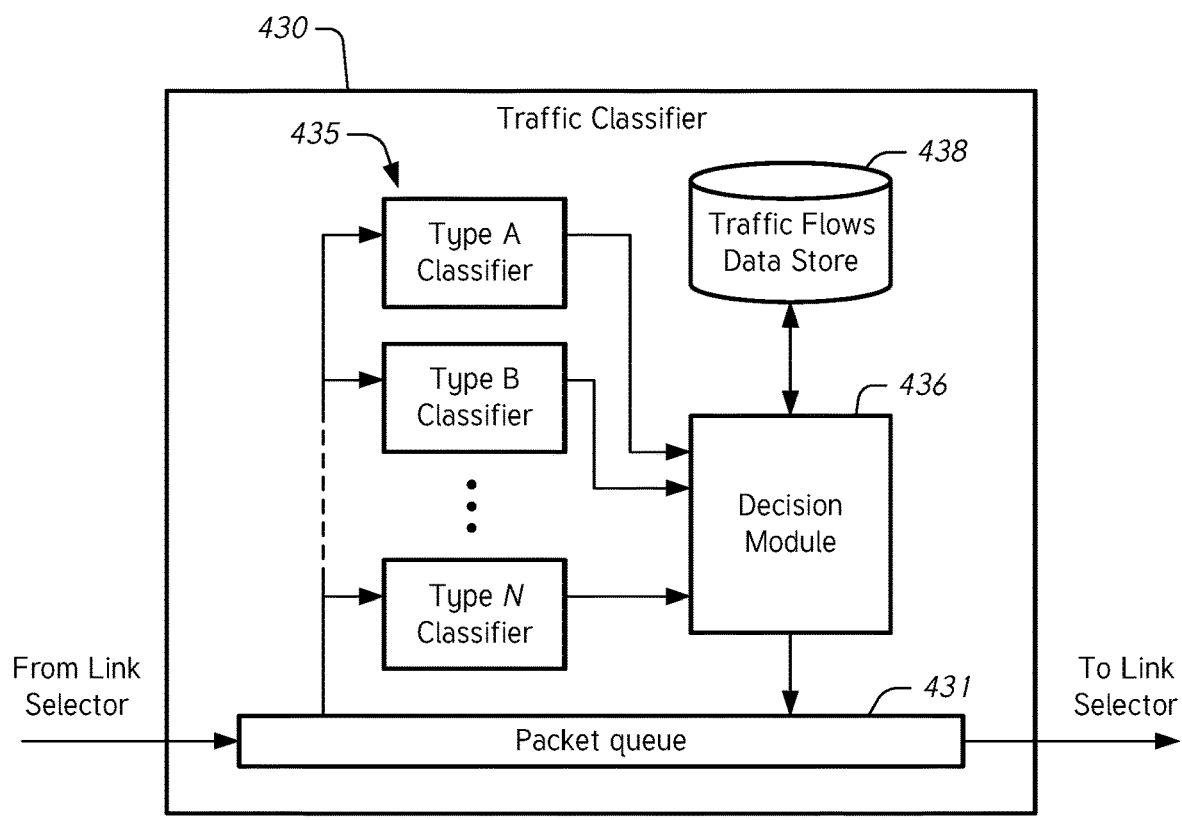
FIG. 4 illustrates a block diagram of an example traffic classifier having parallel classifier types.

FIG. 4 illustrates a block diagram of an example traffic classifier 430 having parallel classifier types 435. The parallel classifier types 435 enable different classification techniques to be employed in parallel to reduce or minimize adverse effects on the network data path as well as to leverage the strengths of different classification techniques while reducing or minimizing the weaknesses of such techniques. The traffic classifier 430 can be implemented in any of the communications systems described herein with reference to FIGS. 1-2C.

The traffic classifier 430 includes a packet queue 431 that receives network packets from a link selector (e.g., any of the link selectors described herein with reference to FIGS. 1-3). The packet queue 431 is configured to replicate the received packets and to send the copies to the parallel classifier types 435, each of the parallel classifier types 435 receiving a copy of the received packets. The packet queue 431 is also configured to receive classifications from a decision module 436 and to match the classification to the appropriate packet. The packet queue 431 is also configured to send the classified packet back to the link selector.

The traffic classifier 430 includes parallel classifier types 435 that each provide traffic classifications for the packets they receive from the packet queue 431. These individual classifications are aggregated and analyzed by the decision module 436 to generate single output classification for a network packet.

Each type of classifier of the plurality of classifier types 435 receives a copy of the packets from the packet queue 431. Each type of classifier then analyzes the received packet based on the technique or algorithm implemented by that classifier. Each type of classifier then outputs a classification of the packet and sends that to the decision module 436 for further processing.

Each classifier type 435 is of a different type where type refers to the approach, technique, algorithm, code, etc. used to determine a classification. The classifier types 435 are different from one another. Examples of types of classifiers or techniques that may be implemented by an individual type of classifier include, without limitation, port-based techniques, payload-based techniques, decision tree techniques, machine learning (ML) techniques, deep packet inspection (DPI) techniques (e.g., signature-matching DPI), traffic flow statistical techniques, protocol-based techniques, device fingerprinting, traffic flow characteristics, or any combination of these techniques. The output of each classifier type 435 includes an initial classification and an identifier of the classified packet. In some embodiments, the output of each classifier type 435 is the packet without the data portion of the packet (e.g., just the 5-tuple of the packet) along with the initial classification determined by the classifier type. Each classifier type 435 is configured to inspect the received packets and to determine a classification based on this inspection. In some embodiments, a classifier type 435 may need to inspect multiple packets prior to determining a classification.

The decision module 436 receives the classified packets from each of the classifier types 435 and determines an output classification for individual packets. The decision module 436 analyzes the outputs of each classifier type 435 and interacts with a traffic flows data store 438 to determine the output classification. In some embodiments, the traffic flows data store 438 stores known flows and their classifications. The traffic flows data store 438 may also include weighting factors for the stored flows and their classifications. In certain embodiments, the traffic flows data store 438 stores prior classifications of traffic flows. In various embodiments, the traffic flows data store 438 includes weights or scores associated with results from each classifier type 435. In this way, the traffic flows data store 438 enables quick classification of traffic flows and informs decisions of the decision module 436.

The decision module 436 interacts with the traffic flows data store 438 in determining classifications for traffic flows. For example, the decision module 436 can retrieve prior classifications for traffic flows from the traffic flows data store 438 to aid in determining a proper or suitable classification for a traffic flow. As another example, the decision module 436 retrieves weights or scores associated with results from the individual classifier types 435. As another example, the decision module 436 can add new entries to the traffic flows data store 438 when a traffic flow has not previously been classified. As another example, the decision module 436 can update existing entries in the traffic flows data store 438 in response to updated or improved classification results. As another example, the decision module 436 can adjust weights of classifications stored in the traffic flows data store 438.

To determine a classification for a packet, the decision module 436 can analyze results from the classifier types 435 in conjunction with prior results and/or weighting factors in the traffic flows data store 438. The decision module 436 can implement algorithms, as described herein, to derive an output classification based at least in part on results from the classifier types 435, prior classification results of similar traffic flows, and/or weighting factors associated with the classifier types 435.

The decision module 436 sets an indicator in each queued packet that indicates the classification of its traffic flow. The decision module 436 sends the packet (without the data portion of the packet) with the indicator to the packet queue 431. The packet queue 431 locates the original packet and adds the classification to that packet prior to sending it back to the link selector. In some embodiments, the packet queue 431 matches the classified packet received from the decision module 436 with the original packet by finding packets with matching 5-tuple information.

The traffic classifier 430 can be implemented on a general or specific-purpose computing device using one or more processors. Similarly, the traffic classifier 430 can be implemented using multiple distributed computing devices. In such distributed embodiments, the functions of the one computing device are distributed (e.g., over a network) such that some functions are performed on each of the distributed computing devices. The processors and classifier types 435 can be implemented as virtual machines running in a cloud environment.

Figure 5:
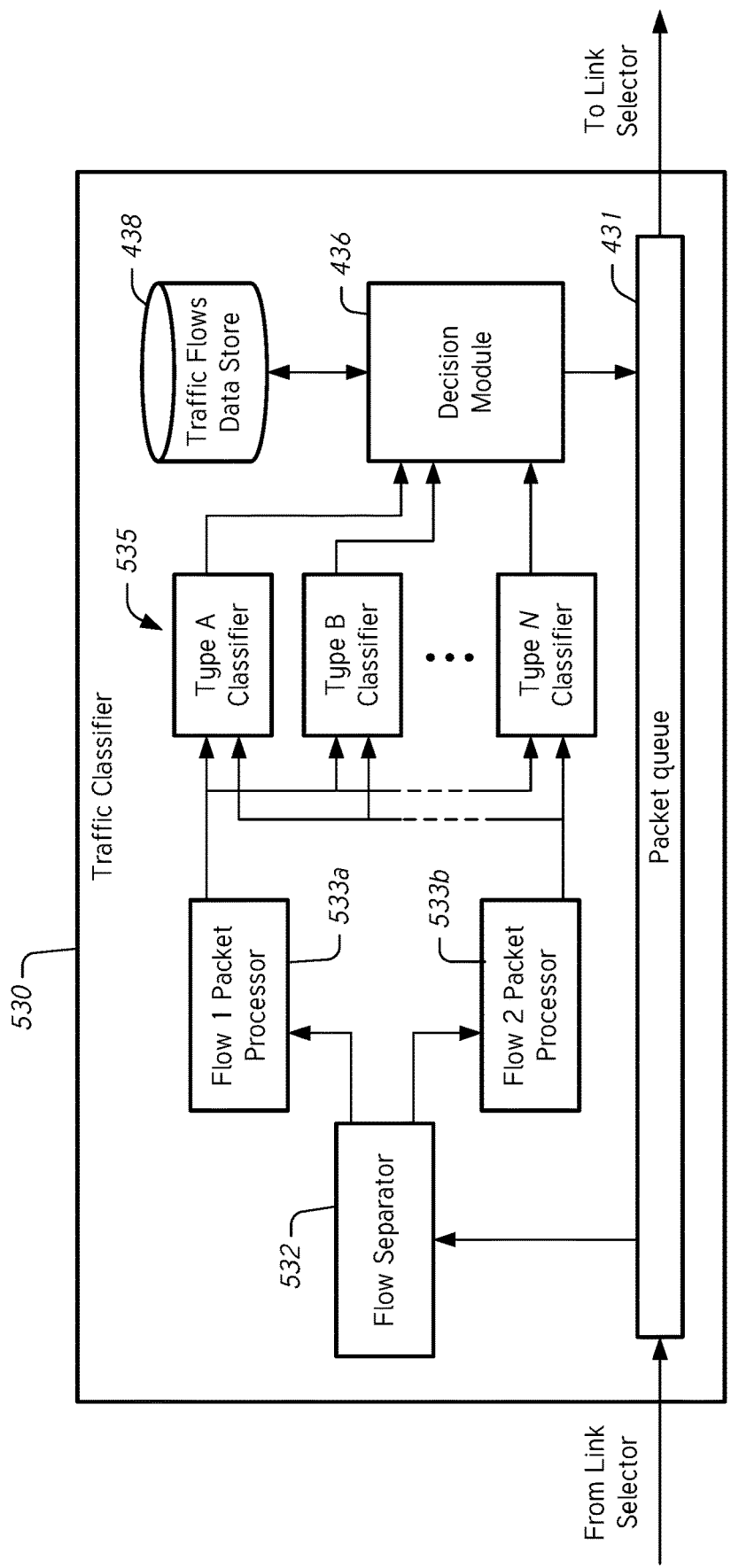
FIG. 5 illustrates a block diagram of another example traffic classifier having parallel classifier types.

FIG. 5 illustrates a block diagram of another example traffic classifier 530. The traffic classifier 530 includes some of the same components as the traffic classifier 430 and will thus not be described again for the sake of conciseness. In particular, the traffic classifier 530 includes the packet queue 431, the decision module 436, and the traffic flows data store 438 that are the same as the corresponding components in the traffic classifier 430.

The traffic classifier 530 includes a flow separator 532 and flow packet processors 533*a*, 533*b*. As in the traffic classifier 430, the packet queue 431 receives packets from the link separator and replicates the received packets for classification. The replicated packets are sent to the flow separator 532 that is configured to provide a coarse separation of packets into distinct traffic flows. In some embodiments, the flow separator 532 analyzes packets to determine unique traffic flows (e.g., by analyzing its 5-tuple which includes a source internet protocol (IP) address including IPv4 and IPv6 addresses, a destination IP address including IPv4 and IPv6 addresses, a source port, a destination port, and a protocol). In some embodiments, the flow separator 532 hashes the 5-tuple or similar data and separates packets into flows based on this or similar analysis. It should be noted that the flow separator 532 is not necessarily classifying the traffic flow but it is separating unique traffic flows from one another. This can be done so that individual traffic flows can be processed in parallel by the classifier types 535.

The distinct flows identified by the flow separator 532 are sent to flow packet processors 533*a*, 533*b*. Two packet processors are shown here, but it should be understood that more than two packet processors may be included. The flow packet processors 533*a*, 533*b* are configured to receive traffic flows from the flow separator 532 and to process the received packets. Processing the packets includes removing damaged packets, selecting batches of packets for classification, etc. The flow packet processors 533*a*, 533*b* queue packets for classification by each classifier type 535. The flow packet processors 533*a*, 533*b* can be virtual machines that are spun up as new flows are identified by flow separator 532, thus the number of flow packet processors is not restricted to two, but can be 1, 3, 4, 5, etc.

The traffic classifier 530 also includes parallel classifier types 535, similar to the parallel classifier types 435, where individual classifier types 535 are configured to process multiple traffic flows in parallel. The traffic flows are queued by the flow packet processors 533*a*, 533*b*. In some embodiments, each classifier type 535 is configured to process multiple traffic flows in parallel. These results are sent to the decision module 436, as in the traffic classifier 430, and processing proceeds as described with reference to FIG. 4.

In some embodiments, individual classifier types 535 include a plurality of classifiers (running in parallel or in serial) and can be spun up when needed. For example, where multiple traffic flows are being processed in parallel, a parallel instance of a particular type of classifier can be used for each traffic flow so that multiple traffic flows can be processed in parallel within a particular classifier type. This can be done to speed up processing of multiple parallel traffic flows. This also advantageously allows for individual classifier types 535 to include a plurality of virtual machines that can be spun up or spun down as the number of traffic flows to be processed changes (e.g., a classifier of each type can be spun up for each flow being processed in parallel).

Figure 6:
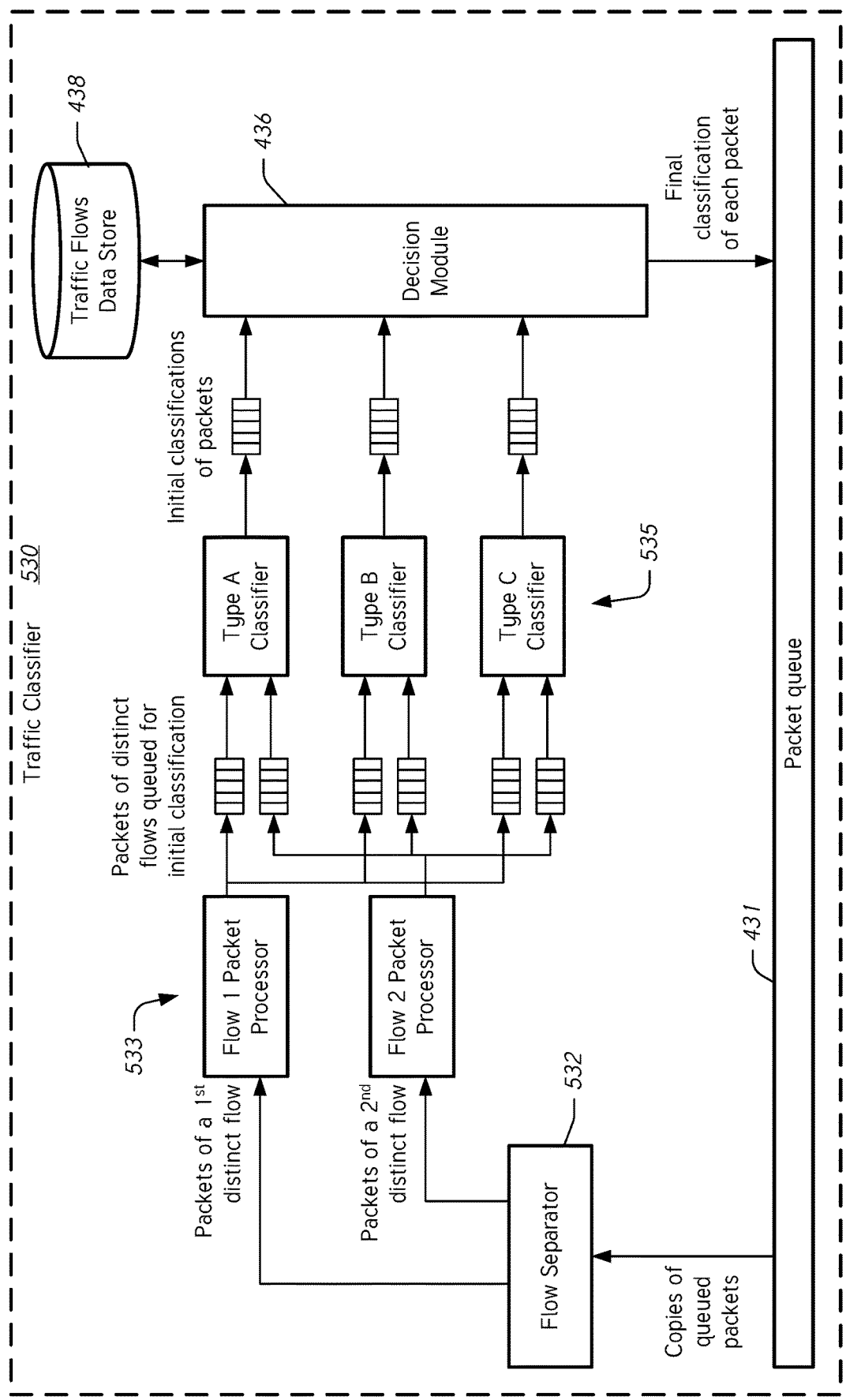
FIG. 6 illustrates schematically a process to classify traffic flows using an example implementation of the traffic classifier of FIG. 5.

FIG. 6 illustrates schematically a process to classify traffic flows using an example implementation of the traffic classifier 530 of FIG. 5. The packet queue 431 replicates received packets and sends the copies of the packets to the flow separator 532. The flow separator 532 identifies distinct flows from the received packets. The flow separator 532 can be configured to identify distinct flows by analyzing 5-tuple data, for example. As another example, the flow separator 532 can identify a unique flow by identifying packets traveling between two hosts that have common properties and where inter-packet times are less than a flow timeout value.

For each distinct flow identified by the flow separator 532, a flow packet processor 533 is spun up (e.g., using a unique processor, virtual machine, or the like). The packet processor 533 processes an individual flow, as described herein, and places processed packets from the distinct flow into a queue to be analyzed by the classifier types 535. Thus, for each classifier type 535, there can be a plurality of parallel queues of packets to be processed, each parallel queue corresponding to a distinct traffic flow.

The classifier types 535 can process in parallel the packets of distinct flows to generate an initial classification for each packet. In the example implementation of FIG. 6, the type A classifier includes signature-matching deep packet inspection (DPI) (e.g., nDPI, an open source DPI traffic classifier), the type B classifier utilizes traffic flow statistics (e.g., for video, relevant statistics include packet length and times, byte distribution, etc.), and the type C classifier includes machine learning or artificial intelligence techniques (e.g., QMDPI, an open source ML traffic classifier).

Each classifier type 535 outputs a classification and a packet identifier (e.g., the packet's 5-tuple), which are queued for analysis by the decision module 436. The decision module 436 analyzes the results from the classifier types 535 for individual packets and determines a final or output classification for each packet. The decision module 436 interacts with the traffic flows data store 438 to retrieve prior classification results for equivalent traffic flows and/or weighting factors for results from individual classifier types 535.

By way of example, the decision module 436 can determine an output classification for a packet using the following algorithm. In some instances, different classifier types 535 require different numbers of packets to classify a traffic flow. In such instances, the decision module 436 can adopt the classification provided by the first classifier type to provide an initial classification. As additional classifier types finish, the decision module can decide to take no action, (i.e., leave the classification unchanged) or update the classification based on the new result. Once the final classifier finishes, the final classification can be locked in for that traffic flow.

In deciding whether to update a classification based on a new result from a classifier type, the decision module 436 can employ a number of different techniques. For example, the decision module 436 can adopt the classification from the classifier type with the highest individual weight as retrieved from the traffic flows data store 438. As another example, the decision module 436 can adopt the classification with the highest aggregate weight (e.g., summing all the weights from the classifier types that have provided results). As another example, the decision module 436 can adopt the classification when that classification comes from a classifier type specifically designed to identify that type of traffic flow (e.g., if a video-specific classifier type classifies the traffic flow as video, the decision module 436 can classify the traffic flow as video). As another example, the decision module 436 can adopt the classification corresponding to the results from the most classifier types (e.g., where two classifier types classify the traffic flow as web data and one classifier type classifies it as video, the decision module 436 can classify the traffic flow as web data). In this way, classification of traffic flows can be fine-tuned and iterated to achieve an accurate result.

Figure 7:
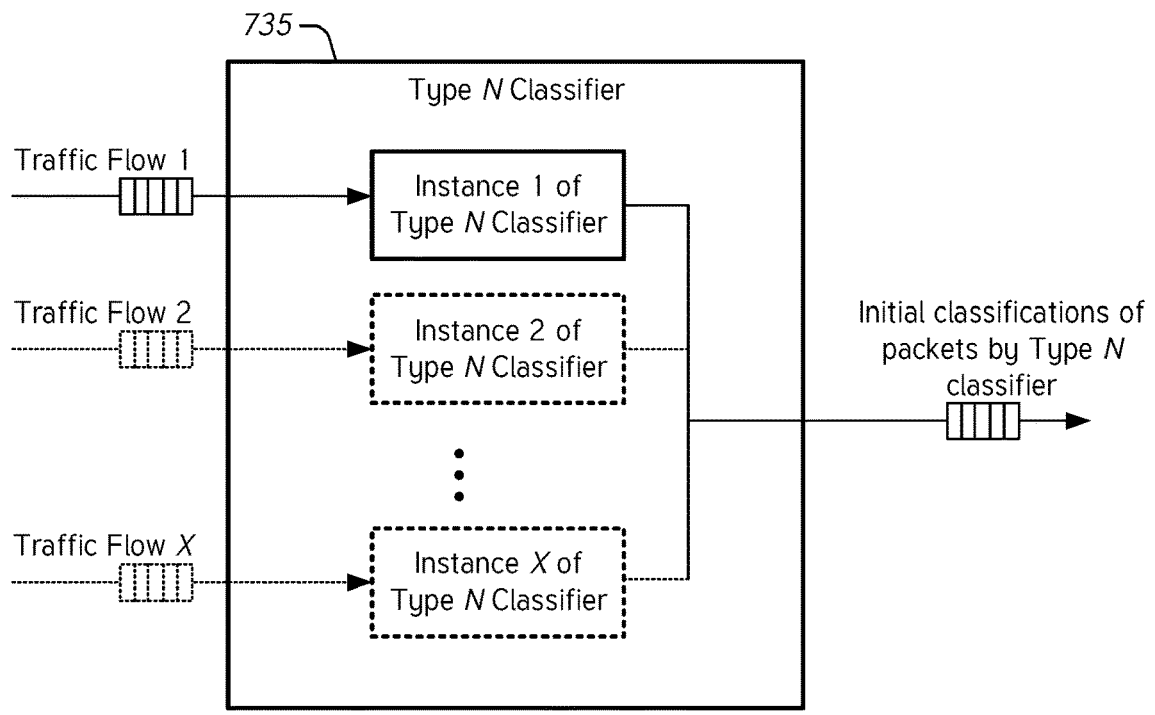
FIG. 7 illustrates a block diagram of an example traffic classifier type with scalable instances of the classifier type to process a varying number of traffic flows in parallel.

FIG. 7 illustrates a block diagram of an example traffic classifier type 735 with scalable instances of the classifier type 735 to process a varying number of traffic flows in parallel. An individual scalable instance of the classifier type 735 can be a replication of the classification technique of the classifier type that uses a separate or distinct process thread, processor, virtual machine, computing device, or the like.

An individual scalable instance can be implemented temporarily to handle classification of a distinct traffic flow or a distinct queue of packets from a traffic flow. When the distinct traffic flow has been classified, or the distinct packet queue has been completed, that particular scalable instance can be removed from the processing environment. This can be done to reduce or eliminate consumption of computing resources by that particular scalable instance when it is not classifying network traffic. This process can be repeated for each of a plurality of distinct traffic flows or distinct queues of packets to be classified. In other words, a scalable instance of the classifier type 735 can be instantiated for each distinct traffic flow and/or distinct packet queue and then terminated upon completing classification of the packets of the associated traffic flow and/or packet queue. In some instances, temporarily implementing a scalable instance corresponds to assigning the processing job to a distinct processor thread, assigning the processing job to a distinct processor, spinning up a distinct virtual machine in a cloud environment to handle the processing job, or the like. In such instances, terminating the scalable instance upon completing the processing job frees up the processor thread and/or processor assigned to the job and/or enables the associated virtual machine to be decommissioned.

Figure 8:
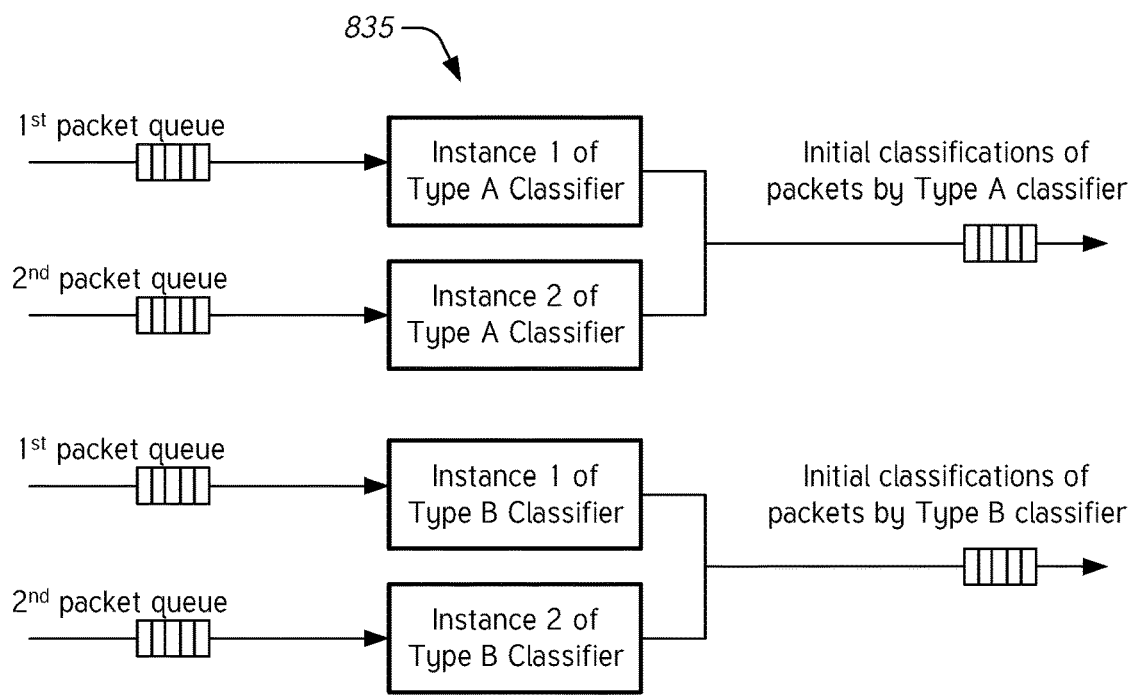
FIG. 8 illustrates a block diagram of an example of a plurality of instances of different classifier types to process a corresponding plurality of packet queues or traffic flows.

FIG. 8 illustrates a block diagram of an example of a plurality of instances of different classifier types 835 to process a corresponding plurality of packet queues or traffic flows. One or more instances of each of the different classifier types 835 can be implemented to classify packet queues or traffic flows in parallel. By way of example and without limitation, network traffic can be processed in parallel by the type A classifier and by the type B classifier, as described herein, and an instance of each type of classifier can be implemented for each distinct packet queue. As illustrated, there are two distinct packet queues (e.g., two distinct traffic flows) that are processed in parallel by each classifier type 835. Furthermore, to increase the efficiency and/or to improve performance, one instance of each classifier type can be implemented for each packet queue (e.g., each traffic flow). Thus, the type A classifier classifies the first packet queue in parallel with the second packet queue using two instances of the type A classifier and the type B classifier classifies the first packet queue in parallel with the second packet queue using two instances of the type B classifier, and the two instances of the type A classifier work in parallel with the two instances of the type B classifier. It should be understood that this example implementation is not limited to two distinct packet queues and is not limited to two different classifier types but could be expanded to process more than two packet queues in parallel and/or to utilize more than two different classifier types, as described elsewhere herein.

In FIGS. 7-8, the traffic classifier types 735, 835 can be any of the traffic classifier types 435, 535 described herein with respect to FIGS. 4-6. For example, individual classifier types 435, 535 in the respective traffic classifiers 430, 530 of FIGS. 4-6 can have one or more instances of that classifier type to process in parallel one or more corresponding traffic flows or packet queues.

Examples of Traffic Classifiers with Tiered Classifiers

Figure 9:
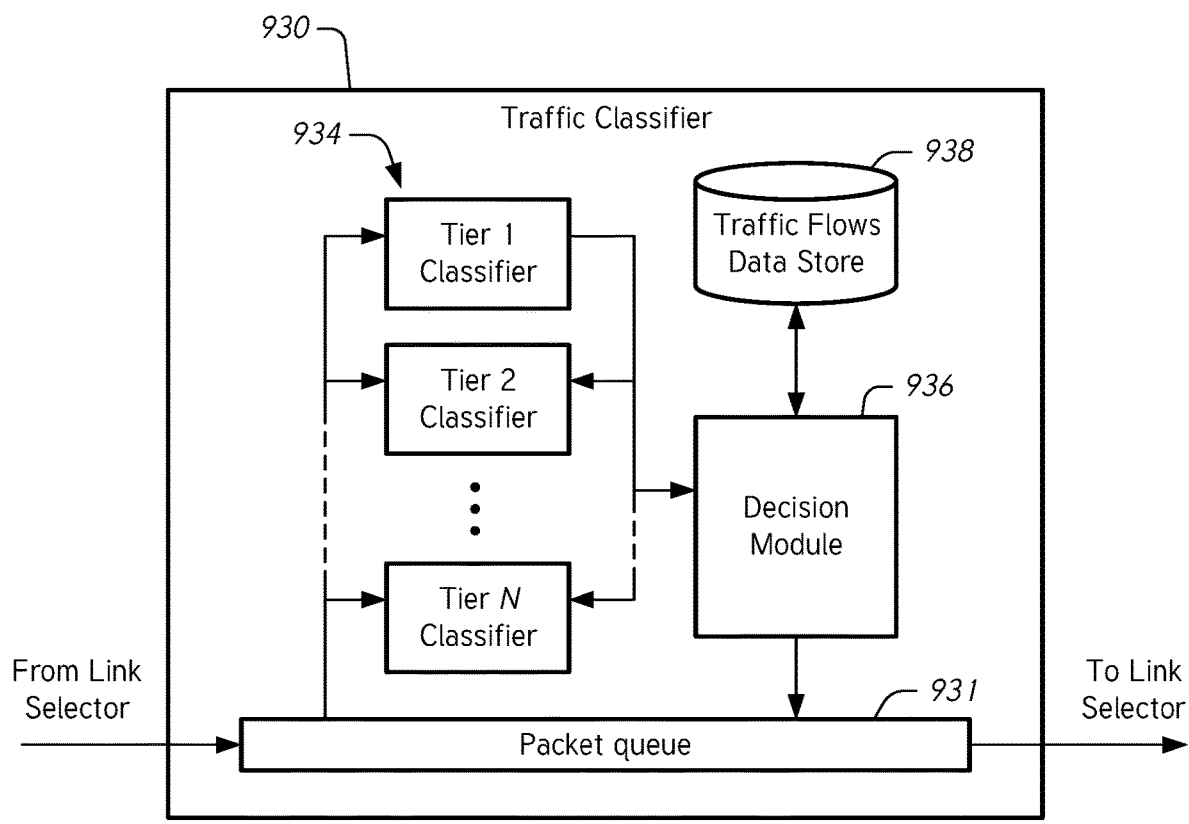
FIG. 9 illustrates a block diagram of an example traffic classifier having tiered classifiers.

FIG. 9 illustrates a block diagram of an example traffic classifier 930 having tiered classifiers 934. The tiered classifiers 934 are configured to complement one another to enhance or to improve classification results. In some embodiments, the tiered classifiers 934 can operate in parallel. In such embodiments, each tiered classifier 934 can process network packets simultaneously with the other tiered classifiers 934 with little or no adverse effects on data path performance. In some embodiments, the tiered classifiers 934 can operate in serial. For example, first the tier 1 classifier determines a classification with a score or confidence level, then, if necessary, tier 2 classifier determines a classification, then, if necessary, tier 3 classifier determines a classification, and so on. In such embodiments, if a tier determines a classification with a confidence level that exceeds a threshold, the remaining tiers can be skipped. This may reduce the amount of computing resources consumed to determine network packet classifications. The traffic classifier 930 can be implemented in any of the communications systems described herein with reference to FIGS. 1-2C.

The traffic classifier 930 includes a packet queue 931 that receives network packets from a link selector (e.g., any of the link selectors described herein with reference to FIGS. 1-3). The packet queue 931 is configured to replicate the received packets and to send the copies to the tiered classifiers 934, each of the tiered classifiers 934 receiving a copy of the received packets. The packet queue 931 is also configured to receive classifications from a decision module 936 and to match the classification to the appropriate packet. The packet queue 931 is also configured to send the classified packet back to the link selector.

The traffic classifier 930 includes tiered classifiers 934 that each provide traffic classifications for the packets they receive from the packet queue 931. These individual classifications are aggregated and analyzed by the decision module 936 to generate single output classification for a network packet.

Each tiered classifier 934 receives a copy of the packets from the packet queue 931. Each tiered classifier 934 then analyzes the received packet based on the technique or algorithm implemented by that classifier. Each tiered classifier 934 then outputs a classification of the packet and sends that to the decision module 936 for further processing. As described herein, the tiered classifiers 934 may operate in parallel and/or in serial. When operating in serial, one or more of the tiered classifiers 934 may not process a queued packet to determine a classification for that packet. This may occur when one or more higher tiered classifiers sufficiently determines a classification for that packet, rendering further classification redundant, inefficient, or unnecessary.

Each tiered classifier 934 implements a different technique to classify a network packet. The tiered classifiers 934 are configured to complement one another. Examples of classifiers or techniques that may be implemented by an individual classifier tier include, without limitation, port-based techniques, payload-based techniques, decision tree techniques, machine learning (ML) techniques, deep packet inspection (DPI) techniques (e.g., signature-matching DPI), traffic flow statistical techniques, traffic flow characteristics, device fingerprinting, protocol-based techniques, or any combination of these techniques. The output of each tiered classifier 934 includes an initial classification, a confidence level, and an identifier of the classified packet. In some embodiments, the output of each tiered classifier is the packet without the data portion of the packet (e.g., just the 5-tuple of the packet) along with the classification determined by the classifier. Each tiered classifier 934 is configured to inspect the received packets and to determine a classification based on this inspection. In some embodiments, a tiered classifier may need to inspect multiple packets prior to determining a classification.

The decision module 936 receives the classified packets from each of the tiered classifiers 934 and determines an output classification for individual packets. The decision module 936 analyzes the outputs of each tiered classifier 934 and interacts with a traffic flows data store 938 to determine the output classification. In some embodiments, the traffic flows data store 938 stores known flows and their classifications. The traffic flows data store 938 may also include weighting factors or confidence levels for the stored flows and their classifications. In certain embodiments, the traffic flows data store 938 stores prior classifications of traffic flows. In various embodiments, the traffic flows data store 938 includes weights or scores associated with results from each tiered classifier 934. In this way, the traffic flows data store 938 enables quick classification of traffic flows and informs decisions of the decision module 936.

The decision module 936 interacts with the traffic flows data store 938 in determining classifications for traffic flows. For example, the decision module 936 can retrieve prior classifications for traffic flows from the traffic flows data store 938 to aid in determining a proper or suitable classification for a traffic flow. As another example, the decision module 936 retrieves confidence levels, weights or scores associated with results from the individual tiered classifiers 934. As another example, the decision module 936 can add new entries to the traffic flows data store 938 when a traffic flow has not previously been classified. As another example, the decision module 936 can update existing entries in the traffic flows data store 938 in response to updated or improved classification results. As another example, the decision module 936 can adjust weights or confidence levels of classifications stored in the traffic flows data store 938.

To determine a classification for a packet, the decision module 936 can analyze results from the tiered classifiers 934. The decision module 936 can treat the results in a tiered fashion, first analyzing the results from tier 1, then the results from tier 2, and so on. The decision module 936 can receive a confidence level from the respective tiered classifiers 934, the confidence level (or score) associated with the likelihood that the initial classification from the tiered classifier is accurate. In determining the output classification, the decision module 936 can analyze the confidence levels from the tiered classifiers. In some embodiments, the tiered classifiers 934 are arranged so that, in general, the confidence levels provided by a higher tier are higher than a lower tier. In certain implementations, the confidence level of a higher tier can be around an order of magnitude higher than a lower tier. The decision module 936 can determine the output classification based on an analysis of the confidence levels received from the tiered classifiers 934 in conjunction with prior classification results and/or weighting factors in the traffic flows data store 938. The decision module 936 can implement algorithms, as described herein, to derive an output classification based at least in part on results from the tiered classifiers 934 and/or prior classification results of similar traffic flows.

The decision module 936 sets an indicator in each queued packet that indicates the classification of its traffic flow. The decision module 936 sends the packet (without the data portion of the packet) with the indicator to the packet queue 931. The packet queue 931 locates the original packet and adds the classification to that packet prior to sending it back to the link selector. In some embodiments, the packet queue 931 matches the classified packet received from the decision module 936 with the original packet by finding packets with matching 5-tuple information.

The traffic classifier 930 can be implemented on a general or specific-purpose computing device using one or more processors. Similarly, the traffic classifier 930 can be implemented using multiple distributed computing devices. In such distributed embodiments, the functions of the one computing device are distributed (e.g., over a network) such that some functions are performed on each of the distributed computing devices. The processors and tiered classifiers 934 can be implemented as virtual machines running in a cloud environment.

Figure 10:
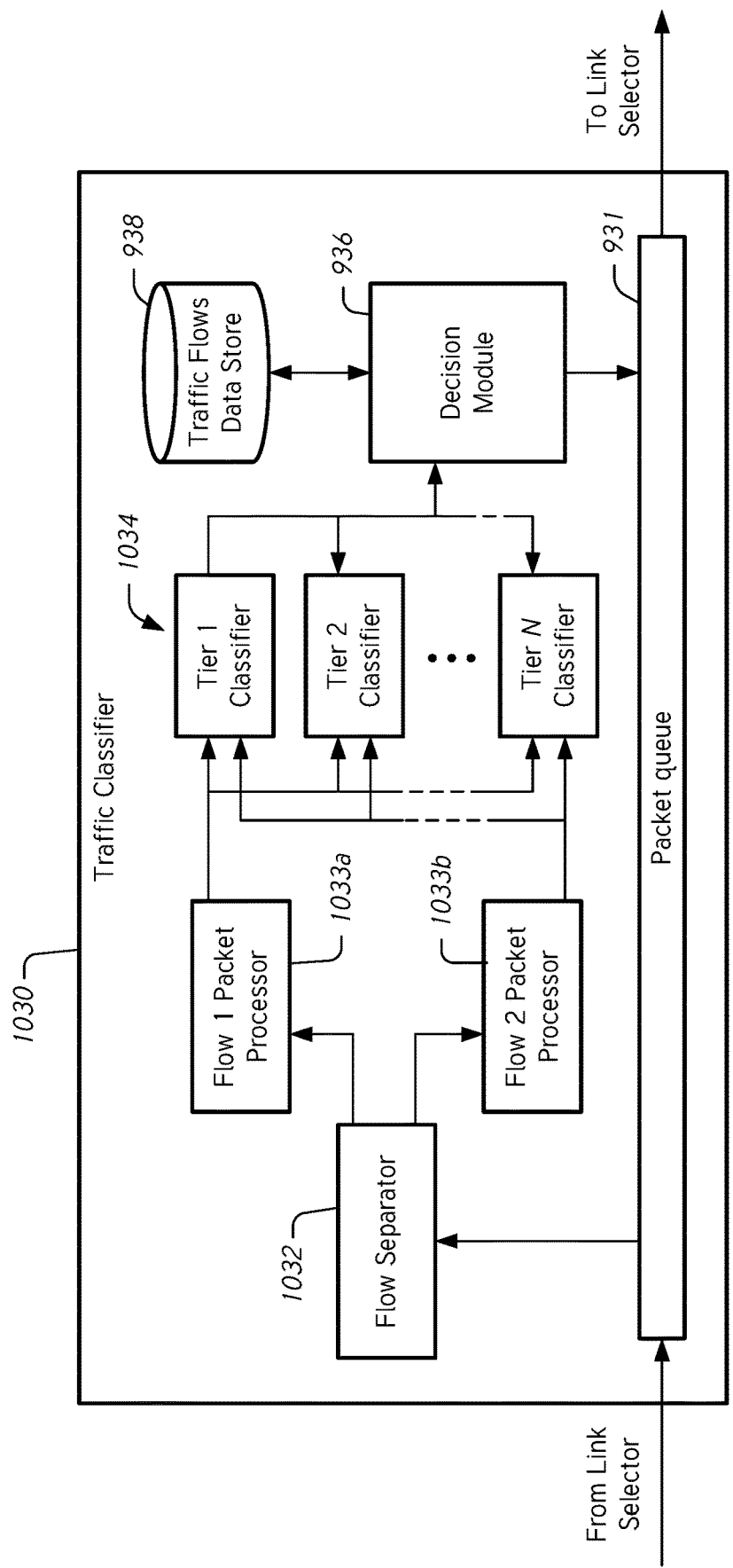
FIG. 10 illustrates a block diagram of another example traffic classifier.

FIG. 10 illustrates a block diagram of another example traffic classifier 1030. The traffic classifier 1030 includes some of the same components as the traffic classifier 930 and will thus not be described again for the sake of conciseness. In particular, the traffic classifier 1030 includes the packet queue 931, the decision module 936, and the traffic flows data store 938 that are the same as the corresponding components in the traffic classifier 930.

The traffic classifier 1030 includes a flow separator 1032 and flow packet processors 1033*a*, 1033*b*. As in the traffic classifier 930, the packet queue 931 receives packets from the link separator and replicates the received packets for classification. The replicated packets are sent to the flow separator 1032 that is configured to provide a coarse separation of packets into distinct traffic flows. In some embodiments, the flow separator 1032 analyzes packets to determine unique traffic flows (e.g., by analyzing its 5-tuple which includes a source internet protocol (IP) address including IPv4 and IPv6 addresses, a destination IP address including IPv4 and IPv6 addresses, a source port, a destination port, and a protocol). In some embodiments, the flow separator 1032 hashes the 5-tuple or similar data and separates packets into flows based on this or similar analysis. It should be noted that the flow separator 1032 is not necessarily classifying the traffic flow but it is separating unique traffic flows from one another. This can be done so that individual traffic flows can be processed in parallel by each of the tiered classifiers 1034.

The distinct flows identified by the flow separator 1032 are sent to flow packet processors 1033*a*, 1033*b*. Two packet processors are shown here, but it should be understood that more than two packet processors may be included. The flow packet processors 1033*a*, 1033*b* are configured to receive traffic flows from the flow separator 1032 and to process the received packets. Processing the packets includes removing damaged packets, selecting batches of packets for classification, etc. The flow packet processors 1033*a*, 1033*b* queue packets for classification by each tiered classifier 1034. The flow packet processors 1033*a*, 1033*b* can be virtual machines that are spun up as new flows are identified by flow separator 1032, thus the number of flow packet processors is not restricted to two, but can be 1, 3, 4, 5, etc.

The traffic classifier 1030 also includes tiered classifiers 1034, similar to the tiered classifiers 934, where individual tiered classifiers 1034 are configured to process multiple traffic flows in parallel. The traffic flows are queued by the flow packet processors 1033*a*, 1033*b*. In some embodiments, each tiered classifier 1034 is configured to process multiple traffic flows in parallel. These results are sent to the decision module 936, as in the traffic classifier 930, and processing proceeds as described with reference to FIG. 9.

In some embodiments, individual tiered classifiers 1034 include a plurality of classifiers (running in parallel or in serial) and can be spun up when needed. For example, where multiple traffic flows are being processed in parallel, a parallel instance of a particular tiered classifier can be used for each traffic flow so that multiple traffic flows can be processed in parallel within a particular tiered classifier. This can be done to speed up processing of multiple parallel traffic flows. This also advantageously allows for individual tiered classifiers 1034 to include a plurality of virtual machines that can be spun up or spun down as the number of traffic flows to be processed changes (e.g., a classifier of each tier can be spun up for each flow being processed in parallel).

Figure 11:
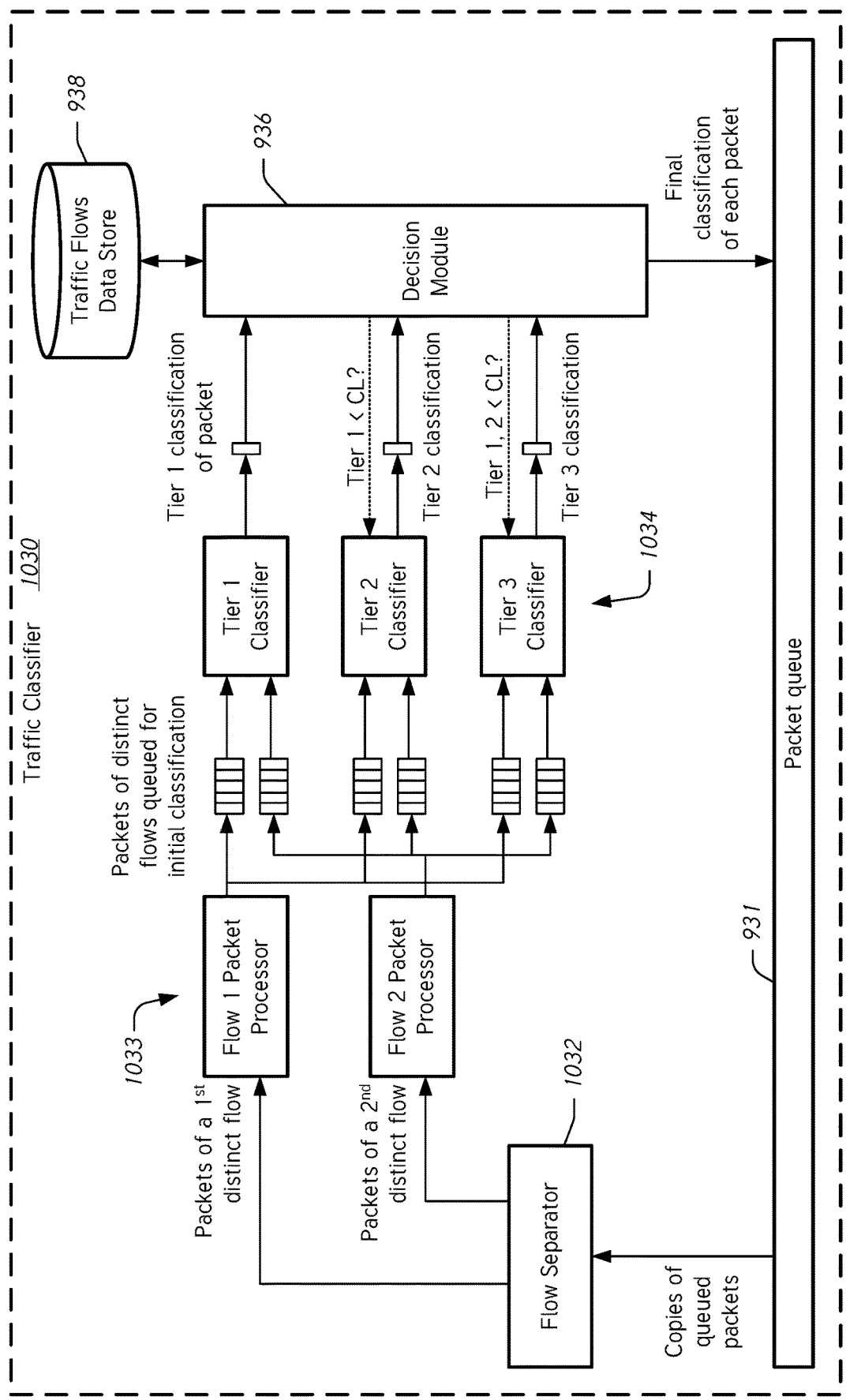
FIG. 11 illustrates schematically a process to classify traffic flows using an example implementation of the traffic classifier of FIG. 10.

FIG. 11 illustrates schematically a process to classify traffic flows using an example implementation of the traffic classifier 1030 of FIG. 10. The packet queue 931 replicates received packets and sends the copies of the packets to the flow separator 1032. The flow separator 1032 identifies distinct flows from the received packets. The flow separator 1032 can be configured to identify distinct flows by analyzing 5-tuple data, for example. As another example, the flow separator 1032 can identify a unique flow by identifying packets traveling between two hosts that have common properties and where inter-packet times are less than a flow timeout value.

For each distinct flow identified by the flow separator 1032, a flow packet processor 1033 is spun up (e.g., using a unique processor, virtual machine, or the like). The packet processor 1033 processes an individual flow, as described herein, and places processed packets from the distinct flow into a queue to be analyzed by the tiered classifiers 1034. Thus, for each tiered classifier 1034, there can be a plurality of parallel queues of packets to be processed, each parallel queue corresponding to a distinct traffic flow.

The tiered classifiers 1034 can process in parallel the packets of distinct flows to generate an initial classification with an associated confidence level for each packet. Each tiered classifier 1034 outputs a classification, a confidence level, and a packet identifier (e.g., the packet's 5-tuple), which are queued for analysis by the decision module 936. The decision module 936 analyzes the results from the tiered classifiers 1034 for individual packets and determines a final or output classification for each packet. The decision module 936 interacts with the traffic flows data store 938 to retrieve prior classification results for equivalent traffic flows and/or weighting factors for results from individual tiered classifiers 1034.

In the example implementation of FIG. 11, the tier 1 classifier includes signature-based deep packet inspection (DPI) technique (e.g., nDPI, an open source DPI traffic classifier). The tier 1 classifier looks for specific signatures in the packet payload for traffic classification. The tier 1 classifier assigns a confidence level to the resulting classification. If the confidence level exceeds a threshold, the packet is deemed classified by the decision module 936. The tier 2 classifier uses traffic flow characteristics to search a database for matches. The traffic flow characteristics can be recorded during the conversation between the server and the client. If there is a match, the tier 2 classifier assigns a confidence level to the resulting classification. For the tier 2 classifier, the database can be build a priori based on prior analyses of traffic flows. The traffic flow characteristics can include, for example and without limitation, client to server packet length, server to client packet length, inter-arrival times between packets, and the like. If the confidence level of tier 2 exceeds a threshold, the packet is deemed classified by the decision module 936. If the result of tier 2 matches tier 1, the threshold for the confidence level can be lower relative to the threshold for tier 2 alone. The tier 3 classifier uses initial handshaking protocol SSL/TLS parameters to identify an end user device or application. The protocol parameters can be extracted during the conversation between the client and the server, for example. If the confidence level of tier 3 exceeds a threshold, the packet is deemed classified by the decision module 936. If the result of tier 3 matches tier 1 and/or tier 3, the threshold for the confidence level can be lower relative to the threshold for tier 3 alone.

In some embodiments, the decision module 936 processes the results from the tiered classifiers 1034 in a serial manner. For example, the decision module 936 analyzes the classification from the tier 1 classifier and determines if it exceeds a threshold. If it does, the decision module 936 assigns an output classification for that packet and proceeds to the next packet. If the confidence level is not high enough, the decision module 936 analyzes the results from the tier 2 classifier. If the confidence level of the tier 2 classifier exceeds a threshold for the tier 2 classifier, the decision module 936 assigns an output classification for that packet and proceeds to the next packet. If the result of the classification from the tier 2 classifier is the same as the result from the tier 1 classifier, the threshold for the tier 2 classifier can be lower than the threshold in the case where the tier 1 and tier 2 classifiers determine different classifications. Similarly, if the tier 2 confidence level is not high enough, the decision module 936 analyzes the results from the tier 3 classifier. If the confidence level of the tier 3 classifier exceeds a threshold for the tier 3 classifier, the decision module 936 assigns an output classification for that packet and proceeds to the next packet. If the result of the classification from the tier 3 classifier is the same as the result from the tier 1 classifier and/or the tier 2 classifier, the threshold for the tier 3 classifier can be lower than the threshold in the case where the tier 3 classifiers determines a different classification than the tier 1 and/or tier 2 classifiers. A similar process can be followed for any suitable number of tiered classifiers in the traffic classifier 1030.

In some embodiments, the decision module 936 can determine an output classification for a packet using an algorithm that accounts for different tiered classifiers needing different numbers of packets to determine an initial classification. In such instances, the decision module 936 can adopt the classification provided by the tiered classifier that first provides an initial classification. As additional classifier tiers finish, the decision module can decide to take no action, (i.e., leave the classification unchanged) or to update the classification based on the new result with its associated confidence level. Once the final tiered classifier finishes, the final classification can be locked in for that traffic flow.

Tiered classifiers 1034 enable the addition of secondary or complementary classifier techniques to enhance a primary technique. A primary technique can be a classification technique that is relatively accurate such as machine learning or deep packet inspection. These and other similar techniques can be enhanced by complementary techniques such as traffic statistical analysis and device fingerprinting. The added complementary techniques may be inaccurate relative to the primary techniques, but the combination of the primary technique with one or more secondary techniques improves classification results. The tier 1 classifiers can be any classification technique described herein that produces a classification with a relatively high confidence level. Lower tiered classifiers (e.g., tier 2 classifiers, tier 3 classifiers, and so on) can be traffic classification techniques that enhance or improve the results of the tier 1 classifiers.

By way of example, a tier 1 classifier can be a proprietary traffic classifier developed by a third party. The network operator can develop lower tier classifiers that improve the results of the tier 1 classifier without needing to modify the tier 1 classifier. This may include adding a tier 2 classifier that is based on a statistical analysis of network traffic flows through the network operator's own infrastructure. The tier 2 classifier can be designed to enhance the results of the proprietary technique implemented in the tier 1 classifier running on the network operator's infrastructure. The tier 2 classifier based on statistical techniques may be inaccurate relative to the tier 1 classifier, but when combined with the tier 1 classifier, results are improved. Similarly, the network operator can add a tier 3 operator based on device fingerprinting that enhances the results from the tier 1 and tier 2 classifiers. The tiered classifiers can thus increase the confidence level of classification results based on information available to the network provider.

Typically, tiered classifiers are ordered from the most effective or most accurate (e.g., based on the confidence level of the results) to the lowest confidence level. Typical tier 1 classifiers include deep packet inspection and machine learning. Typical tier 2 classifiers include techniques that are based on a statistical analysis of traffic flows (e.g., by building a database a priori that is based on internal analysis and/or in-field use). Typical tier 3 classifiers include device fingerprinting or other protocol-based techniques. As used herein, device fingerprinting can include techniques to determine client device and/or application information. For example, prior to encryption, servers and clients typically negotiate encryption keys and algorithms. By looking at the initial handshake, it is possible to figure out what the client is (e.g., XBOX®, ROKU®, APPLE TV®, etc.). This information can be used to enhance classification and, consequently, to help determine the appropriate or desirable link to select for the link selector. For example, some devices or applications are more likely to include latency-sensitive data than other devices or applications.

In some embodiments, different secondary classification techniques can be employed depending on the primary classification technique. For example, a primary tier classifier that employs machine learning techniques may not benefit from a secondary classifier technique based on statistical analysis but may benefit from a secondary classifier technique based on device fingerprinting. In such instances, only two tiers may be employed: the machine learning technique as the primary classifier and device fingerprinting as the secondary classifier. As another example, a primary classifier that employs deep packet inspection may benefit from classifier techniques that employ statistical analysis and device fingerprinting. In such instances, the deep packet inspection technique can be the tier 1 classifier, the statistical analysis technique can be the tier 2 classifier, and the device fingerprinting technique can be the tier 3 classifier.

Figure 12:
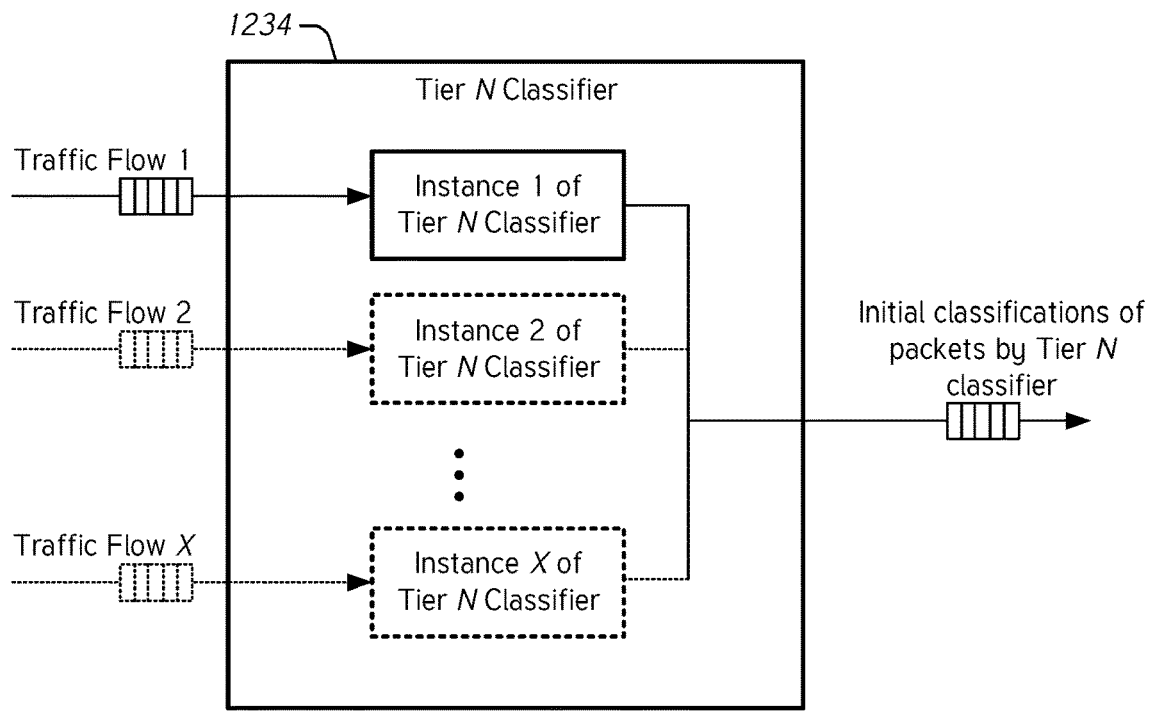
FIG. 12 illustrates a block diagram of an example tiered classifier with scalable instances of the tiered classifier to process a varying number of traffic flows in parallel.

FIG. 12 illustrates a block diagram of an example tiered classifier 1234 with scalable instances of the tiered classifier 1234 to process a varying number of traffic flows in parallel. An individual scalable instance of the tiered classifier 1234 can be a replication of the classification technique of the classifier type that uses a separate or distinct process thread, processor, virtual machine, computing device, or the like.

An individual scalable instance can be implemented temporarily to handle classification of a distinct traffic flow or a distinct queue of packets from a traffic flow. When the distinct traffic flow has been classified, or the distinct packet queue has been completed, that particular scalable instance can be removed from the processing environment. This can be done to reduce or eliminate consumption of computing resources by that particular scalable instance when it is not classifying network traffic. This process can be repeated for each of a plurality of distinct traffic flows or distinct queues of packets to be classified. In other words, a scalable instance of the tiered classifier 1234 can be instantiated for each distinct traffic flow and/or distinct packet queue and then terminated upon completing classification of the packets of the associated traffic flow and/or packet queue. In some instances, temporarily implementing a scalable instance corresponds to assigning the processing job to a distinct processor thread, assigning the processing job to a distinct processor, spinning up a distinct virtual machine in a cloud environment to handle the processing job, or the like. In such instances, terminating the scalable instance upon completing the processing job frees up the processor thread and/or processor assigned to the job and/or enables the associated virtual machine to be decommissioned.

Figure 13:
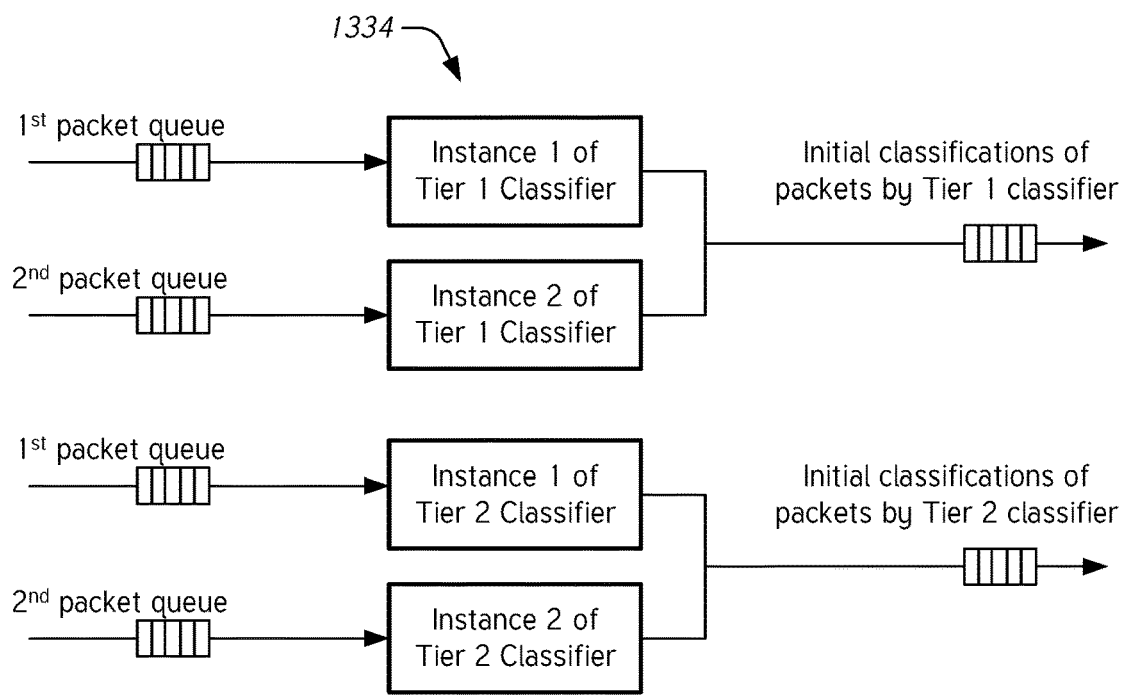
FIG. 13 illustrates a block diagram of an example of a plurality of instances of a tiered classifier to process a corresponding plurality of packet queues or traffic flows.

FIG. 13 illustrates a block diagram of an example of a plurality of instances of a tiered classifier 1334 to process a corresponding plurality of packet queues or traffic flows. One or more instances of each of the different classifier tiers 1334 can be implemented to classify packet queues or traffic flows in parallel. By way of example and without limitation, network traffic can be processed by the tier 1 classifier and by the tier 2 classifier, as described herein, and an instance of each classifier tier can be implemented for each distinct packet queue. As illustrated, there are two distinct packet queues (e.g., two distinct traffic flows) that are processed by each tiered classifier 1334. Furthermore, to increase the efficiency and/or to improve performance, one instance of each tiered classifier 1334 can be implemented for each packet queue (e.g., each traffic flow). Thus, the tier 1 classifier classifies the first packet queue in parallel with the second packet queue using two instances of the tier 1 classifier and the tier 2 classifier classifies the first packet queue in parallel with the second packet queue using two instances of the tier 2 classifier. In some embodiments, the two instances of the tier 1 classifier work in parallel with the two instances of the tier 2 classifier. It should be understood that this example implementation is not limited to two distinct packet queues and is not limited to two different classifier tiers but could be expanded to process more than two packet queues in parallel and/or to utilize more than two different classifier tiers, as described elsewhere herein.

In FIGS. 12-13, the tiered classifiers 1234, 1334 can be any of the tiered classifiers 934, 1034 described herein with respect to FIGS. 9-11. For example, individual tiered classifiers 934, 1034 in the respective traffic classifiers 930, 1030 of FIGS. 9-11 can have one or more instances of that tiered classifier to process in parallel one or more corresponding traffic flows or packet queues.

Example Traffic Classifiers Using Parallel and Tiered Classifiers

Figure 14:
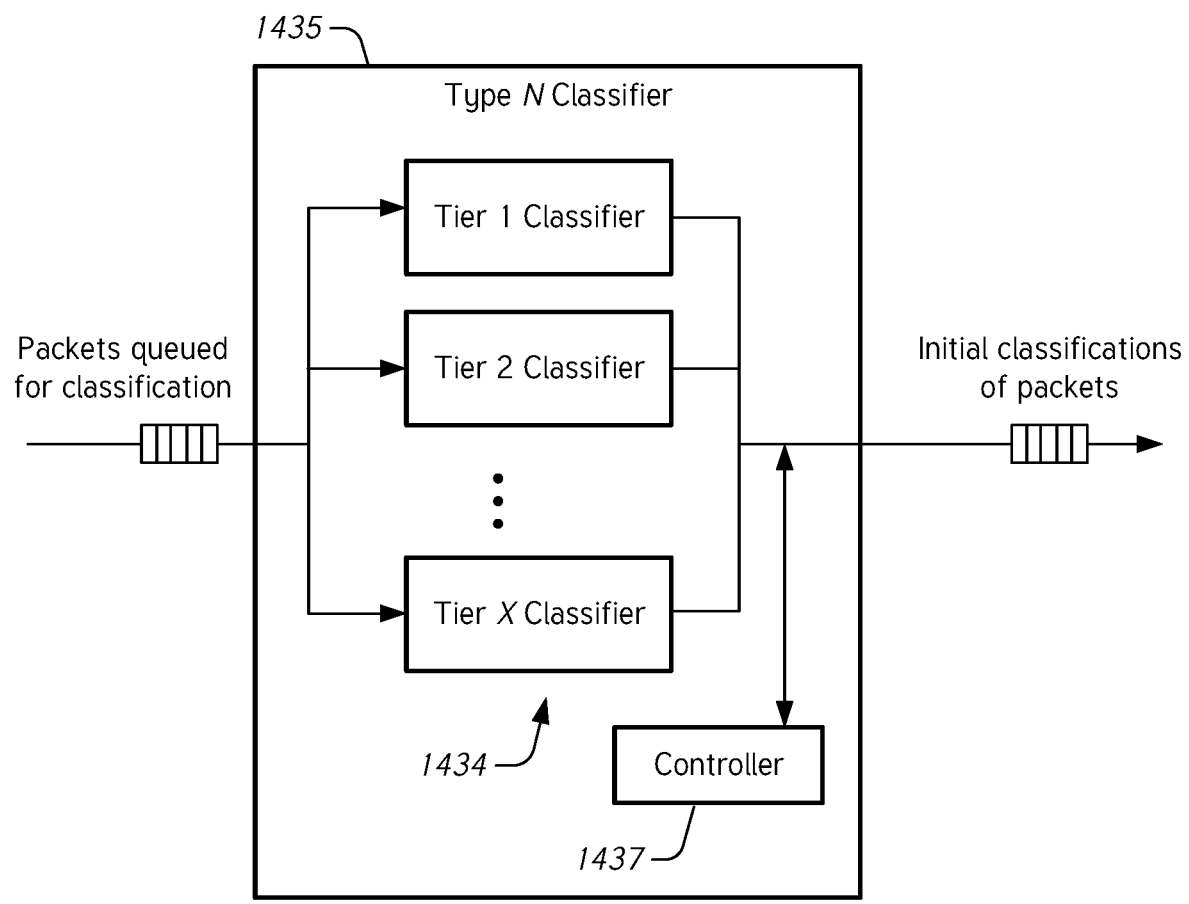
FIG. 14 illustrates a block diagram of an example traffic classifier type that includes tiered classifiers to determine initial classifications of packets.

FIG. 14 illustrates a block diagram of an example traffic classifier type 1435 that includes tiered classifiers 1434 to determine initial classifications of packets. The traffic classifier type 1435 can be any of the traffic classifier types described herein with respect to FIGS. 4-8, the tiered classifiers 1434 can be any of the tiered classifiers described herein with respect to FIGS. 9-13, and the classifier type 1435 can be implemented in any of the traffic classifiers described herein with respect to FIGS. 1-6.

The classifier type 1435 can be enhanced or improved using the tiered classifiers 1434. The tier 1 classifier can be the primary classification technique of the classifier type 1435. The primary classification technique can be improved using one or more secondary techniques implemented in different tiered classifiers. That is, the tier 1 classifier, or the primary technique of the classifier type 1435, can be improved using a tier 2 classifier. In some embodiments, the tier 1 classifier may be enhanced using more tiers such as a tier 3 classifier, a tier 4 classifier, and so on.

The classifier type 1435 can include a controller 1437 configured to control operation of the tiered classifiers 1434. In some embodiments, the controller 1437 operates in a manner similar to the decision modules described herein with respect to FIGS. 9-11. For example, the controller 1437 can determine an initial classification of a packet for the classifier type 1435 based at least in part on the classifications and associated confidence levels determined by the tiered classifiers 1434, as described herein.

Figure 15:
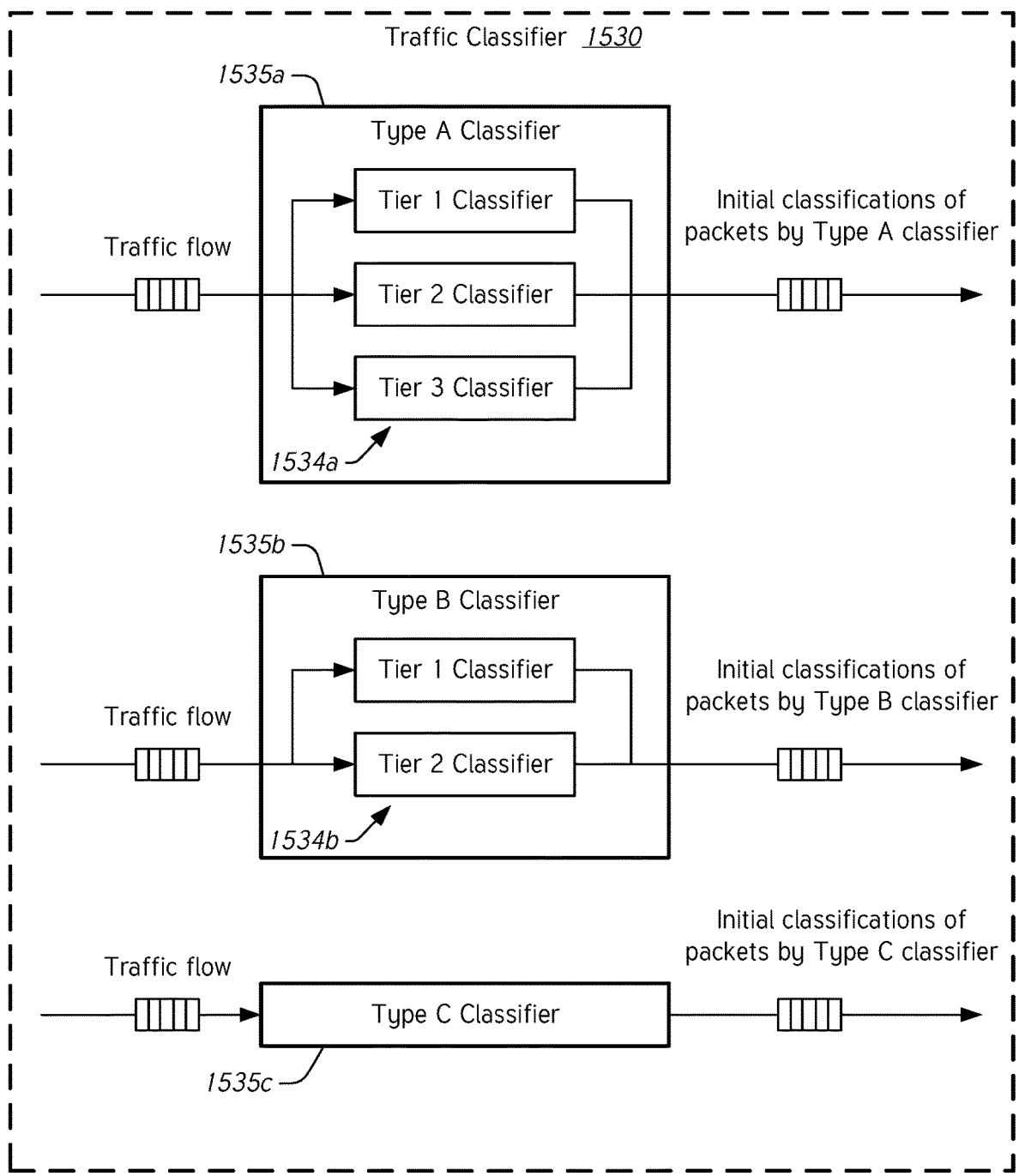
FIG. 15 illustrates a block diagram of an example traffic classifier that includes classifier types wherein individual classifier types may include one or more tiered classifiers.

FIG. 15 illustrates a block diagram of an example traffic classifier 1530 that includes classifier types 1535a, 1535b, 1535c wherein individual classifier types may include one or more tiered classifiers 1534a, 1534b. The traffic classifier types 1535a, 1535b, 1535c can be any of the traffic classifier types described herein with respect to FIGS. 4-8, the tiered classifiers 1534a, 1534b can be any of the tiered classifiers described herein with respect to FIGS. 9-13, and the traffic classifier 1530 can be any of the traffic classifiers described herein with respect to FIGS. 1-6. The traffic classifier 1530 can further include a packet queue, a decision module, and/or a traffic flows data store, as described herein with respect to FIGS. 4-6 and 9-11.

Each classifier type 1535a, 1535b, 1535c analyzes traffic flow packets to determine an initial classification for the packets, the initial classification depending at least in part on the results of the classifications determined by the respective tiered classifiers 1534a, 1534b, where present. The initial classifications of packets are sent to a decision module to determine an output classification for individual packets and traffic flows, as described elsewhere herein.

The type A classifier 1535a includes three tiered classifiers 1534a where the tier 1 classifier represents the primary classification technique implemented by the type A classifier 1535a. The tiered classifiers 1534a are configured to be complementary to one another so that each subsequent tier to tier 1 serves to improve the classification results of the tier 1 classifier. The type B classifier 1535b includes two tiered classifiers 1534b where the tier 1 classifier represents the primary classification technique implemented by the type B classifier 1535b. The tier 2 classifier is complementary to the tier 1 classifier and serves to improve the results of the tier 1 classifier. The type C classifier 1535c does not include any tiered classifiers, implementing a primary classification technique without any complementary or secondary classification techniques to enhance the primary technique.

In some embodiments, the type A classifier 1535*a* includes a DPI technique as the tier 1 classifier, a statistical analysis as the tier 2 classifier, and a device fingerprinting technique as the tier 3 classifier. In some embodiments, the type B classifier 1535*b* includes a machine learning technique as the tier 1 classifier and a device fingerprinting technique as the tier 2 classifier. In some embodiments, the type C classifier 1535*c* includes a different primary classification technique such as, for example and without limitation, port-based techniques, payload-based techniques, decision tree techniques, traffic flow statistical techniques, protocol-based techniques, traffic flow characteristics, or the like.

It should be understood that the tier 1 classifier of the type A classifier 1535*a* and/or the tier 1 classifier of the type B classifier 1535*b* can be any suitable classification technique including any of the techniques described herein. Furthermore, the number of classifier types of the traffic classifier 1530 can vary (e.g., 2, 3, 4, 5, or more classifier types). Similarly, the number of tiered classifiers in each classifier type can be the same or different from one another. In some embodiments, the tier 1 classifiers in individual classifier types may differ but may include common approaches or techniques for secondary tiered classifiers. In certain implementations, the secondary tiered techniques that are common across multiple classifier types may be tailored to improve or enhance the unique primary technique implemented by the classifier type in which it is included.

Example Methods for Classifying Traffic Flows

Figure 16:
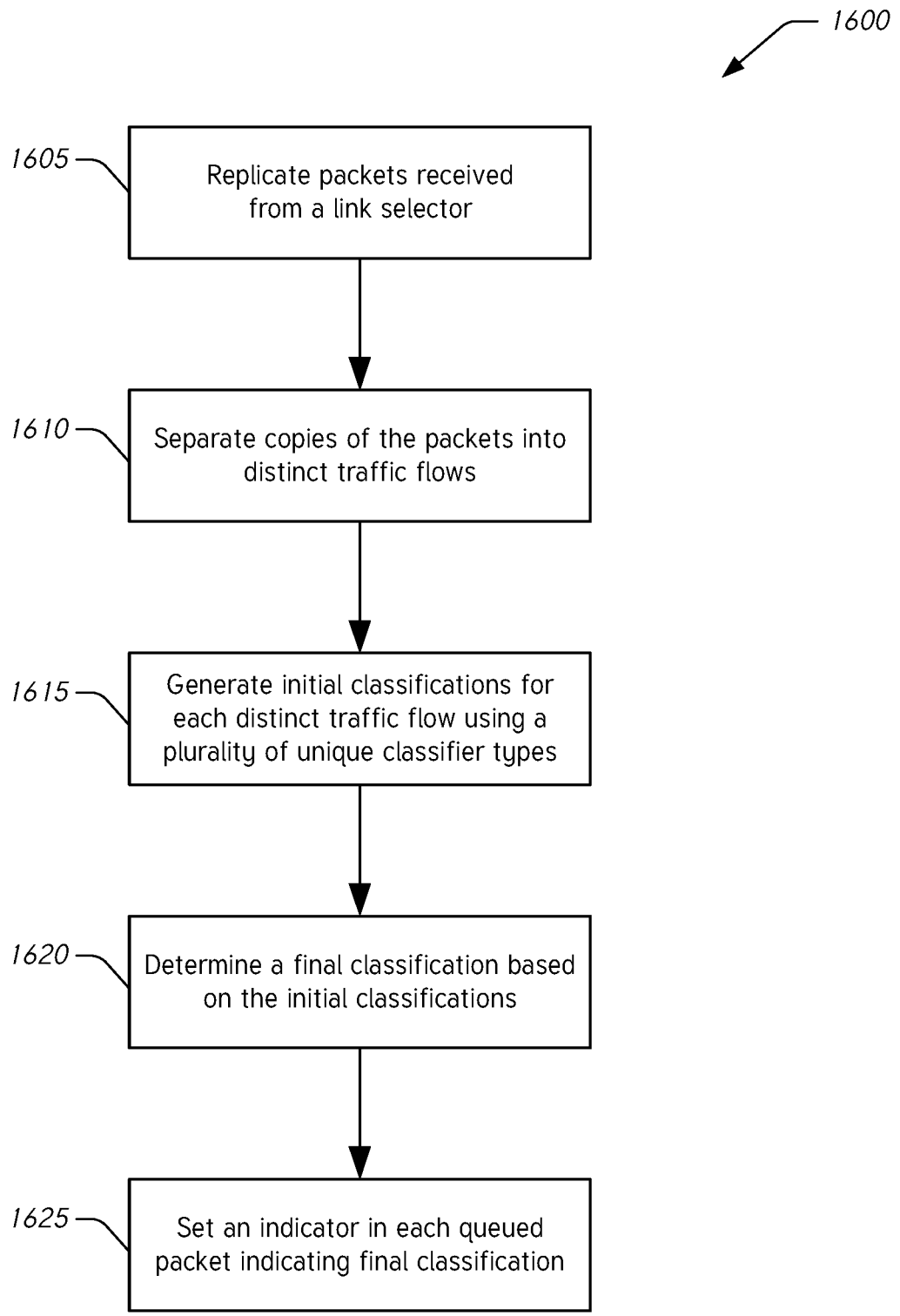
FIG. 16 illustrates a flow chart of an example method of classifying traffic flows using parallel classifier types.

FIG. 16 illustrates a flow chart of an example method 1600 of classifying traffic flows using parallel classifier types. The method 1600 can be performed in any of the traffic classifiers described herein with reference to FIGS. 1-6.

In block 1605, the traffic classifier replicates packets received from a link selector. In block 1610, the traffic classifier separates copies of the packets into distinct traffic flows. The distinct traffic flows can be identified using any suitable technique or algorithm. An example technique is to analyze the 5-tuple of the packets to identify traffic flows that have common hosts, ports, and protocols. A timeout element may also be included in the algorithm for identifying distinct traffic flows.

In block 1615, the traffic classifier generates a plurality of initial classifications for each distinct traffic flow using a plurality of unique classifier types in parallel. Each classifier type utilizes a different classification technique or algorithm, as described herein. Outputs of each classifier includes a flow identifier of the packet and an initial classification. In some embodiments, the data portion of the packet is dropped after the initial classification is determined by the classifier type.

In block 1620, the traffic classifier determines a traffic classification based on the plurality of initial classifications. Determining the traffic classification can include comparing results from the initial classifications and selecting a classification based on individual weights, aggregate weights, confidence levels in the classification of a particular classifier type, majority wins techniques, previous results stored in a data store, or a combination of these techniques or the like as described herein. In some embodiments, the classification determined by the traffic classifier can change for a particular traffic flow over time as additional classifier types provide classification results.

In some embodiments, if the traffic flow has not previously been classified, the traffic classifier can create a new entry in a data store (e.g., a database) for the flow and its final classification. In certain embodiments, if the traffic flow has previously been classified, the traffic classifier can utilize the previous classification in making the final classification decision. In various embodiments, the traffic classifier can update the classification in the data store when changes in final classification occur. In some embodiments, the traffic classifier can weight the initial classifications of each classifier type and any prior classification (e.g., as stored in the data store).

In block 1625, the traffic classifier marks, tags, or otherwise sets an indicator in each queued packet indicating the final or output classification of its traffic flow.

Figure 17:
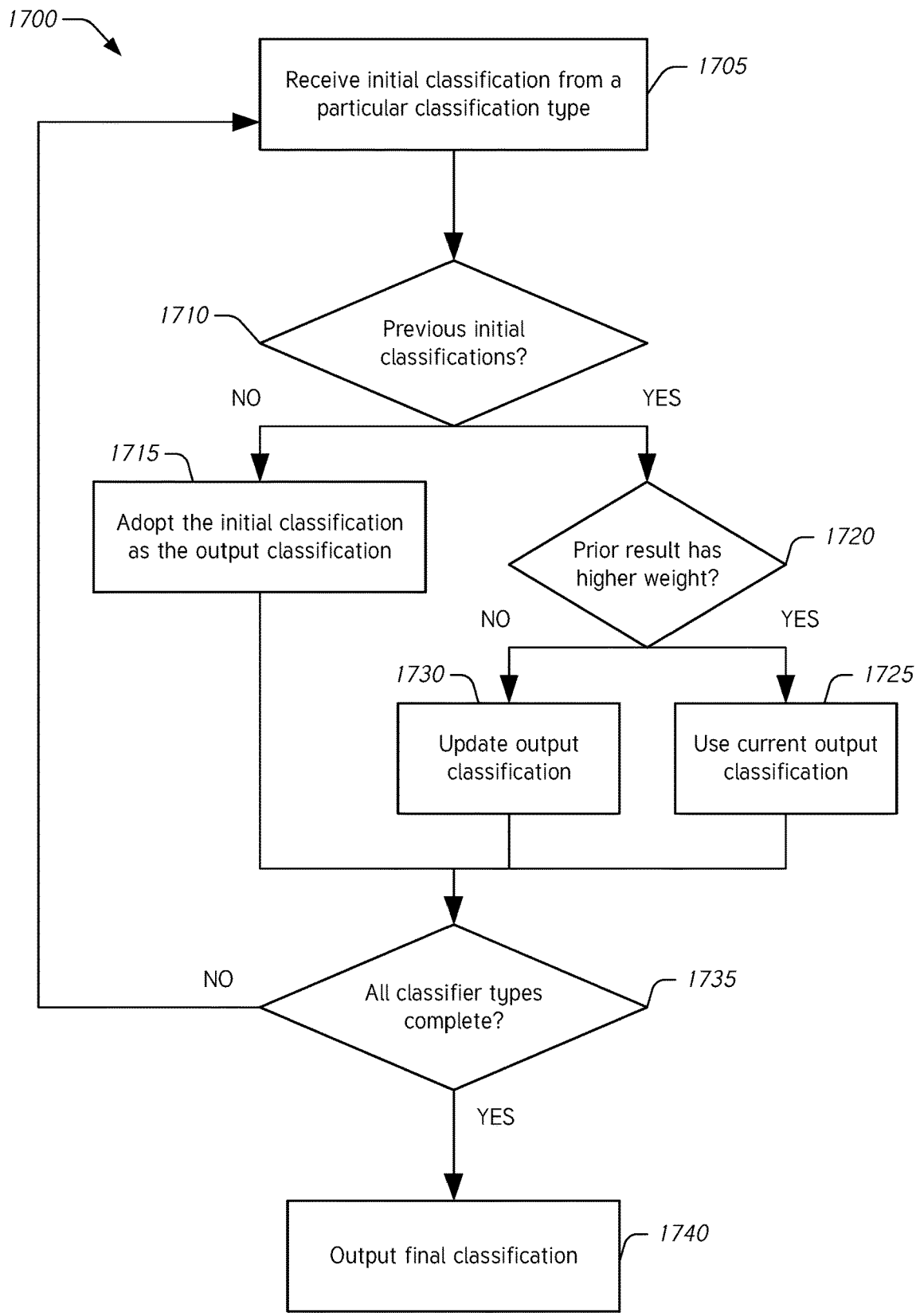
FIG. 17 illustrates a flow chart of an example method of determining a classification for a traffic flow using the results from parallel classifier types.

FIG. 17 illustrates a flow chart of an example method 1700 of determining a classification for a traffic flow using the results from parallel classifier types. The method 1700 can be performed by the decision module of any of the traffic classifiers described herein with reference to FIGS. 4-6.

In the method 1700, the decision module assigns a weight a priori for each classifier type. The weight can be retrieved from a data store, for example. In addition, results from particular classifier types can be compared with existing entries in the data store. Where there are discrepancies, the differences can be logged for evaluation of the classifier type. In addition, results from particular classifier types can be stored in the data store to provide entries indicating classifications for particular traffic flows provided by particular classifier types.

In block 1705, the decision module receives an initial classification from a particular classifier type. In block 1710, the decision module compares the initial classification from the particular classifier type to results from other classifier types. If this is the first initial classification, the decision module adopts the classification as the output classification in block 1715. If this is not the first initial classification, the decision module compares the newly received classification to the current output classification in block 1720. If the prior result has a higher weight than the newly received result, the current output classification remains unchanged in block 1725. If the prior result has a lower weight than the newly received result, the output classification is updated to reflect the latest result in block 1730.

In block 1735, the decision module checks to see if all classifier types have finished processing the traffic flow. If so, the decision module provides the final output classification in block 1740. If not, the decision module returns to block 1710 to receive an initial classification from a new classifier type.

Figure 18:
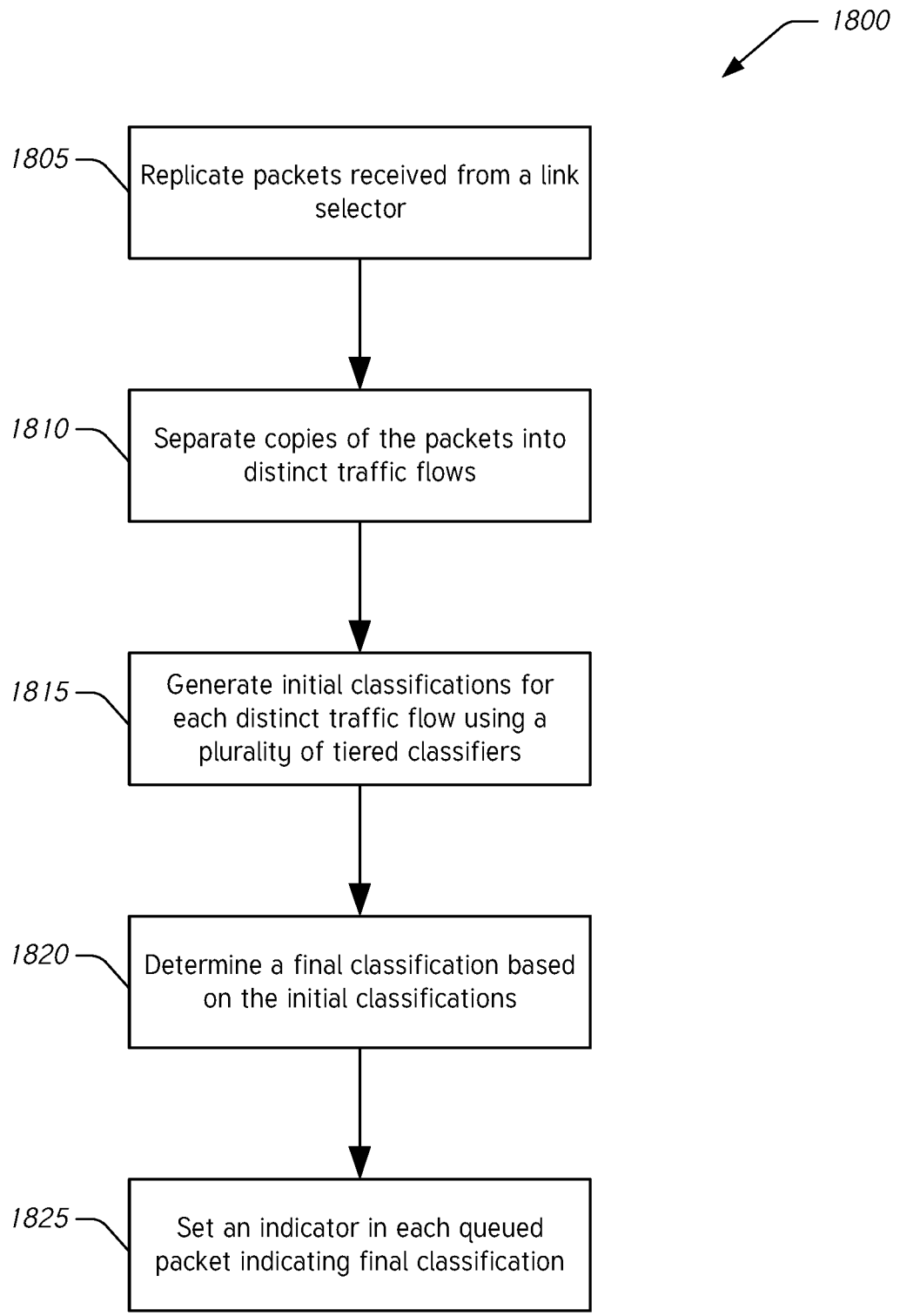
FIG. 18 illustrates a flow chart of an example method of classifying traffic flows using tiered classifiers.

FIG. 18 illustrates a flow chart of an example method 1800 of classifying traffic flows using tiered classifiers. The method 1800 can be performed in any of the traffic classifiers described herein with reference to FIGS. 1-3 and 9-11.

In block 1805, the traffic classifier replicates packets received from a link selector. In block 1810, the traffic classifier separates copies of the packets into distinct traffic flows. The distinct traffic flows can be identified using any suitable technique or algorithm. An example technique is to analyze the 5-tuple of the packets to identify traffic flows that have common hosts, ports, and protocols. A timeout element may also be included in the algorithm for identifying distinct traffic flows.

In block 1815, the traffic classifier generates a plurality of initial classifications for each distinct traffic flow using a plurality of tiered classifiers. Each secondary tiered classifier utilizes a classification technique or algorithm that enhances the results of a primary classification technique, as described herein. Outputs of each tiered classifier includes a flow identifier of the packet, an initial classification, and a confidence level of the classification. In some embodiments, the data portion of the packet is dropped after the initial classification is determined by the tiered classifier.

In block 1820, the traffic classifier determines a traffic classification based on the plurality of initial classifications. Determining the traffic classification can include analyzing the classifications and associated confidence levels determined by the tiered classifiers. The traffic classification can be determined by comparing confidence levels to thresholds set for each tier and/or tier combinations. If the confidence level exceeds the threshold for the associated tier (which may take into account classifications from higher level tiers), the final classification can be set. If the confidence level does not exceed the threshold, one or more subsequent tiers can be analyzed to determine the classification. In some embodiments, the classification determined by the traffic classifier can change for a particular traffic flow over time as additional tiered classifiers provide classification results.

In some embodiments, if the traffic flow has not previously been classified, the traffic classifier can create a new entry in a data store (e.g., a database) for the flow and its final classification. In certain embodiments, if the traffic flow has previously been classified, the traffic classifier can utilize the previous classification in making the final classification decision. In various embodiments, the traffic classifier can update the classification in the data store when changes in final classification occur. In some embodiments, the traffic classifier can weight the initial classifications of each tiered classifier and any prior classification (e.g., as stored in the data store).

In block 1825, the traffic classifier marks, tags, or otherwise sets an indicator in each queued packet indicating the final or output classification of its traffic flow.

Figure 19:
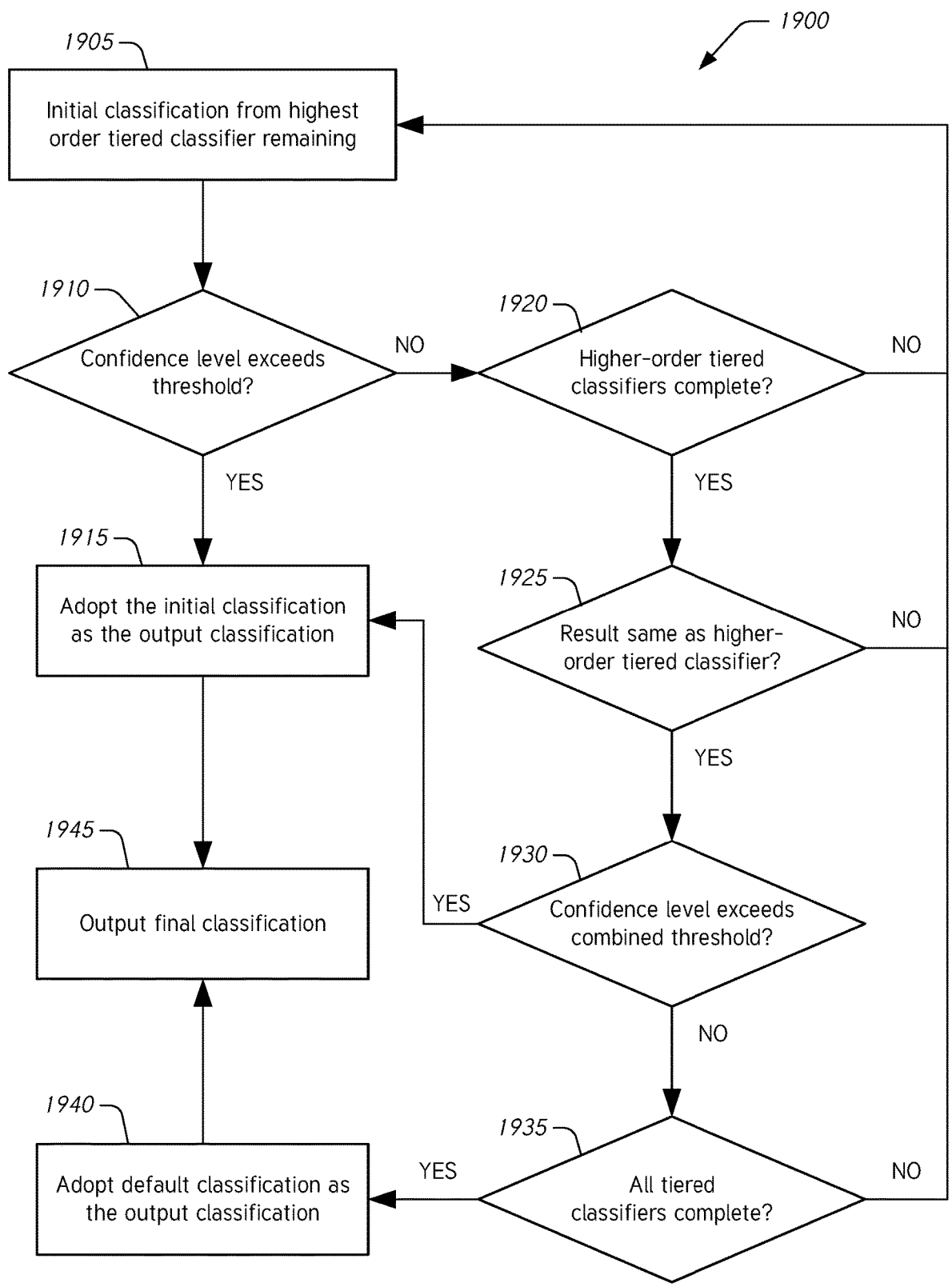
FIG. 19 illustrates a flow chart of an example method of determining a classification for a traffic flow using the results from tiered classifiers.

FIG. 19 illustrates a flow chart of an example method 1900 of determining a classification for a traffic flow using the results from tiered classifiers. The method 1900 can be performed by the decision module of any of the traffic classifiers described herein with reference to FIGS. 9-11.

In block 1905, the decision module receives an initial classification from the highest order tiered classifier that has not been analyzed yet. If no initial classifications have been received for the packet, the initial classification is provided by the tier 1 classifier. If only the tier 1 classifier classification has been analyzed, then the highest order tiered classifier remaining is the tier 2 classifier, and so on. The initial classification is the classification determined by the associated tiered classifier with an accompanying confidence level.

In block 1910, the decision module determines if the confidence level of the classification from the current tiered classifier exceeds a threshold. The threshold is set for that specific tier and can be specific to that tier. For example, different tiers can have different confidence level thresholds. If the confidence level exceeds the threshold for the current tiered classifier, then the decision module adopts the classification determined by the current tiered classifier in block 1915.

If the confidence level does not exceed the threshold, the decision module determines whether any higher ordered tiers have provided classifications in block 1920. If not, such as when the tier 1 classifier confidence level does not exceed the threshold, the decision module receives an initial classification from the next tier in the tiered classifiers by returning to block 1905. If one or more higher ordered tiers has provided classifications, the decision module determines whether the current classification by the current tiered classifier matches one or more higher ordered tiers in block 1925. If it does not match, the decision module returns to block 1905 to receive classification results from the next tier in the tiered classifiers. If the current classification result matches one or more classification results from a higher ordered tiered classifier, the decision module determines whether the current confidence level exceeds a combined threshold in block 1930. The combined threshold can be tailored for specific tier combinations. For example, a threshold can be set if tier 1 and tier 2 match each other, another threshold can be set if tier 3 matches tier 2, another threshold can be set if tier 3 matches tier 1, another threshold can be set if tier 3 matches both tier 1 and tier 2, and so on.

If the current confidence level exceeds the combined threshold, the decision module adopts the classification of the current tier as the output classification in block 1915. Otherwise, the decision module determines whether there are additional tiers remaining to provide a classification. If there are, the decision module returns to block 1905 to receive classification results from the next tier in the tiered classifiers. If there are no more tiered classifiers remaining, the decision module adopts a default classification as the output classification in block 1940. By way of example, the default classification can be based on the tier 1 classifier result, a combination of two or more tiered classifiers (e.g., based on a combination of confidence levels), or on data stored in a data store.

Once the decision module adopts a classification as the output classification in block 1915 or block 1940, the decision module outputs the final classification in block 1945.

Figure 20:
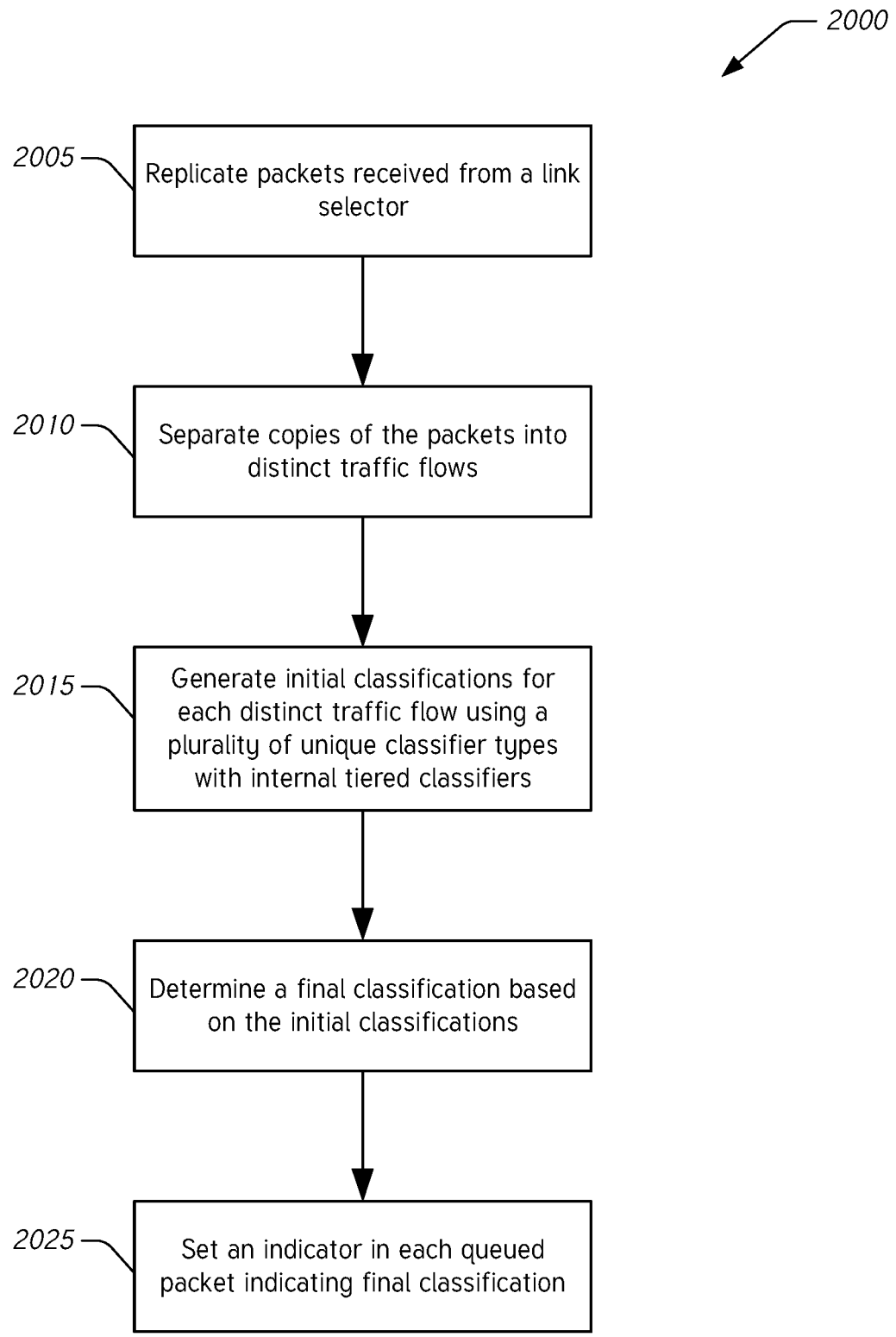
FIG. 20 illustrates a flow chart of an example method of classifying traffic flows using parallel classifier types with internal tiered classifiers.

FIG. 20 illustrates a flow chart of an example method 2000 of classifying traffic flows using parallel classifier types with internal tiered classifiers. The method 2000 can be performed in any of the traffic classifiers described herein with reference to FIGS. 1-6, 14, and 15.

In block 2005, the traffic classifier replicates packets received from a link selector. In block 2010, the traffic classifier separates copies of the packets into distinct traffic flows. The distinct traffic flows can be identified using any suitable technique or algorithm. An example technique is to analyze the 5-tuple of the packets to identify traffic flows that have common hosts, ports, and protocols. A timeout element may also be included in the algorithm for identifying distinct traffic flows.

In block 2015, the traffic classifier generates a plurality of initial classifications for each distinct traffic flow. The plurality of initial classifications is provided by a corresponding plurality of unique classifier types that operate in parallel. Each classifier type utilizes a different classification technique or algorithm, as described herein. One or more of the unique classifier types include tiered classifiers to improve or enhance the primary technique employed by the associated unique classifier type.

The output of each classifier type includes a flow identifier of the packet and an initial classification. For an individual classifier type, the initial classification is determined based at least in part on an analysis of the results and confidence levels of the internal tiered classifiers, examples of which are described herein with respect to FIGS. 9-11, 14, 15, 18 and 19. In some embodiments, the data portion of the packet is dropped after the initial classification is determined by the classifier type.

In block 2020, the traffic classifier determines a traffic classification based on the plurality of initial classifications.

Determining the traffic classification can include comparing results from the initial classifications and selecting a classification based on individual weights, aggregate weights, confidence levels in the classification of a particular classifier type, majority wins techniques, previous results stored in a data store, or a combination of these techniques or the like as described herein. In some embodiments, the classification determined by the traffic classifier can change for a particular traffic flow over time as additional classifier types provide classification results.

In some embodiments, if the traffic flow has not previously been classified, the traffic classifier can create a new entry in a data store (e.g., a database) for the flow and its final classification. In certain embodiments, if the traffic flow has previously been classified, the traffic classifier can utilize the previous classification in making the final classification decision. In various embodiments, the traffic classifier can update the classification in the data store when changes in final classification occur. In some embodiments, the traffic classifier can weight the initial classifications of each classifier type and any prior classification (e.g., as stored in the data store).

In block 2025, the traffic classifier marks, tags, or otherwise sets an indicator in each queued packet indicating the final or output classification of its traffic flow.

Terminology

As used herein, the term traffic flow includes but is not limited to a sequence of packets from a source device to a destination and may include return packets from the destination back to the source device. The destination can be another device, a group, or a domain. Traffic flow also includes a sequence of packets sent from a particular source to a particular destination that the source desires to label as a traffic flow. A traffic flow can also include all packets in a specific transport connection or a media stream. Traffic flow can include a set of packets passing an observation point in a network during a certain time interval. Traffic flow can also include a sequence of packets carrying information between two hosts where packets have common properties (e.g., the same 5-tuple or transposed 5-tuple) and inter-packet times are less than an arbitrary flow expiry timeout value.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A network traffic classifier comprising:
    a packet queue configured to receive network packets for classification and to replicate the received network packets;
    a flow separator configured to receive the replicated network packets from the packet queue and to identify distinct traffic flows within the replicated network packets;
    a plurality of flow packet processors configured to receive the replicated network packets from the flow separator, to process the replicated network packets for each traffic flow identified by the flow separator, and to queue packets for classification into a plurality of classification queues, each classification queue receiving a copy of the replicated network packets;
    a plurality of classifier types operating in parallel, each of the plurality of classifier types configured to receive the copy of the replicated network packets that is in a corresponding classification queue of the plurality of classification queues, each of the plurality of classifier types configured to determine a traffic flow classification for individual network packets of the replicated network packets utilizing network traffic classification techniques that differ from each of the other classifier types; and
    a decision module configured to analyze the traffic flow classifications from each of the plurality of classifier types for each of the replicated network packets to determine an output traffic flow classification that is assigned to individual network packets of the received network packets.

2. The network traffic classifier of claim 1, wherein the flow separator is further configured to generate parallel queues for each classifier type, each parallel queue including network packets from distinct traffic flows.

3. The network traffic classifier of claim 1 further comprising a traffic flows data store configured to store the output traffic flow classification determined by the decision module.

4. The network traffic classifier of claim 3, wherein the decision module is configured to update the traffic flows data store in response to the output traffic flow classification differing from a previously stored output traffic flow classification for an equivalent traffic flow.

5. The network traffic classifier of claim 3, wherein the decision module is configured to generate a new entry in the traffic flows data store in response to the output traffic flow classification being for a unique traffic flow.

6. The network traffic classifier of claim 1, wherein the decision module is configured to update the output traffic flow classification in response to a new traffic flow classification received from one of the plurality of classifier types.

7. The network traffic classifier of claim 1, wherein each classifier type includes a plurality of instances of the classifier type configured to be activated to process in parallel a plurality of distinct traffic flows.

8. The network traffic classifier of claim 1, wherein the plurality of classifier types includes a classifier type that utilizes deep packet inspection and a classifier type that utilizes machine learning to determine the traffic flow classification for individual network packets.

9. A network node coupled to a plurality of networks, the network node comprising:
    a network interface coupled to a plurality of parallel network links;
    a link selector coupled to the network interface and configured to receive network traffic having a plurality of traffic flows and to select one of the plurality of parallel network links for transmitting an individual traffic flow; and a traffic classifier coupled to the link selector, the traffic classifier including:
  a packet queue configured to receive network packets of the received network traffic and to replicate the received network packets;
  a flow separator configured to identify distinct traffic flows within the replicated network packets;
  a plurality of flow packet processors configured to receive the replicated network packets from the flow separator, to process the replicated network packets for each traffic flow identified by the flow separator, and to queue packets for classification into a plurality of classification queues, each classification queue receiving a copy of the replicated network packets; and
  a plurality of parallel classifier types, wherein the traffic classifier is configured to determine a traffic flow classification for individual traffic flows of the plurality of traffic flows using the plurality of parallel classifier types, each of the plurality of parallel classifier types configured to receive the copy of the replicated network packets that is in a corresponding classification queue of the plurality of classification queues,
wherein the link selector selects one of the plurality of parallel network links based at least in part on the traffic flow classification determined by the traffic classifier.

10. The network node of claim 9, wherein each of the plurality of parallel network links have different characteristics.

11. The network node of claim 10, wherein a first network link has a latency that is higher than a latency of a second network link.

12. The network node of claim 9, wherein the plurality of parallel classifier types includes a classifier type that utilizes deep packet inspection and a classifier type that utilizes machine learning to determine the traffic flow classification for individual network packets.

13. The network node of claim 9, wherein the traffic classifier is configured to provide an initial traffic flow classification for a particular traffic flow prior to all of the plurality of parallel classifier types determining individual traffic flow classifications, and to provide a final traffic flow classification that is different from the initial traffic flow classification after each of the plurality of parallel classifier types has determined a traffic flow classification for the particular traffic flow.

14. The network node of claim 9, wherein the link selector is configured to select an initial network link for a particular traffic flow prior to the traffic classifier determining the traffic flow classification for the individual traffic flow and to select a different network link after the traffic classifier determines the traffic flow classification for the particular traffic flow.

15. A communications system comprising:
a core node communicatively coupled to one or more remote nodes through a gateway device, the core node configured to receive network data having a plurality of traffic flows, the core node having a link selector and a traffic classifier, the traffic classifier including:
  a packet queue configured to receive network packets of the received network traffic and to replicate the received network packets;
  a flow separator configured to identify distinct traffic flows within the replicated network packets;
  a plurality of flow packet processors configured to receive the replicated network packets from the flow separator, to process the replicated network packets for each traffic flow identified by the flow separator, and to queue packets for classification into a plurality of classification queues, each classification queue receiving a copy of the replicated network packets; and
  a plurality of parallel classifier types, wherein the traffic classifier is configured to determine a traffic flow classification for individual traffic flows of the plurality of traffic flows using the plurality of parallel classifier types, each of the plurality of parallel classifier types configured to receive the copy of the replicated network packets that is in a corresponding classification queue of the plurality of classification queues;
a client node communicatively coupled to one or more client devices though a routing device;
a first network link communicatively coupling the core node and the client node;
a second network link parallel to the first network link, the second network link communicatively coupling the core node and the client node,
wherein the link selector selects the first network link or the second network link to transmit an individual traffic flow to the client node based at least in part on the traffic flow classification determined by the traffic classifier.

16. The communications system of claim 15, wherein the first network link comprises a first satellite network that includes a low earth orbit satellite and the second network link comprises a second satellite network that includes a geosynchronous earth orbit satellite.

17. The communications system of claim 15, wherein the first network link comprises a satellite network and the second network link comprises a terrestrial network.

18. The communications system of claim 15, wherein the client node comprises a client link selector and a client traffic classifier configured to determine a traffic flow classification for individual return link traffic flows using a plurality of parallel classifier types.

* * * * *